United States Patent
Liu et al.

(10) Patent No.: US 10,740,988 B2
(45) Date of Patent: Aug. 11, 2020

(54) INTERVENTION IN OPERATION OF A VEHICLE HAVING AUTONOMOUS DRIVING CAPABILITIES

(71) Applicant: nuTonomy Inc., Boston, MA (US)

(72) Inventors: Shih-Yuan Liu, Boston, MA (US); Harshavardhan Ravichandran, Singapore (SG); Karl Iagnemma, Belmont, MA (US); Hsun-Hsien Chang, Brookline, MA (US)

(73) Assignee: nuTonomy Inc., Boston, MA (US)

( * ) Notice: Subject to any disclaimer, the term of this patent is extended or adjusted under 35 U.S.C. 154(b) by 25 days.

(21) Appl. No.: 15/624,780

(22) Filed: Jun. 16, 2017

(65) Prior Publication Data
US 2018/0365908 A1  Dec. 20, 2018

(51) Int. Cl.
| | |
|---|---|
| *G07C 5/00* | (2006.01) |
| *G05D 1/00* | (2006.01) |
| *G06N 99/00* | (2019.01) |
| *G06N 20/00* | (2019.01) |
| *G06N 5/00* | (2006.01) |

(52) U.S. Cl.
CPC ............ *G07C 5/006* (2013.01); *G05D 1/005* (2013.01); *G05D 1/0022* (2013.01); *G05D 1/0044* (2013.01); *G05D 1/0061* (2013.01); *G05D 1/0088* (2013.01); *G06N 5/003* (2013.01); *G06N 20/00* (2019.01); *G05D 2201/0213* (2013.01); *G07C 5/008* (2013.01)

(58) Field of Classification Search
None
See application file for complete search history.

(56) References Cited

U.S. PATENT DOCUMENTS

| | | | |
|---|---|---|---|
| 7,734,387 B1 | 6/2010 | Young et al. | |
| 8,965,621 B1 * | 2/2015 | Urmson | B60W 50/14 701/23 |
| 8,996,224 B1 * | 3/2015 | Herbach | G05D 1/0011 701/23 |
| 9,632,502 B1 * | 4/2017 | Levinson | G05D 1/0027 |
| 9,646,428 B1 * | 5/2017 | Konrardy | G08G 1/096741 |
| 10,037,683 B1 | 7/2018 | Hosey et al. | |
| 10,317,899 B2 | 6/2019 | Liu et al. | |
| 10,514,692 B2 | 12/2019 | Liu et al. | |
| 2004/0267424 A1 * | 12/2004 | Yao | B62D 5/003 701/43 |
| 2008/0046142 A1 | 2/2008 | Jordan et al. | |

(Continued)

FOREIGN PATENT DOCUMENTS

| | | |
|---|---|---|
| EP | 1584816 | 10/2005 |
| JP | 2002-046554 | 2/2002 |

OTHER PUBLICATIONS

U.S. Appl. No. 15/624,802, filed Jun. 16, 2017, Liu et al.

(Continued)

*Primary Examiner* — Adam D Tissot
(74) *Attorney, Agent, or Firm* — Fish & Richardson P.C.

(57) ABSTRACT

Among other things, a determination is made that intervention in an operation of one or more autonomous driving capabilities of a vehicle is appropriate. Based on the determination, a person is enabled to provide information for an intervention. The intervention is caused in the operation of the one or more autonomous driving capabilities of the vehicle.

45 Claims, 15 Drawing Sheets

(56) References Cited

U.S. PATENT DOCUMENTS

| | | | |
|---|---|---|---|
| 2010/0234993 A1 | 9/2010 | Seelinger et al. | |
| 2010/0241329 A1* | 9/2010 | Fujimura | B60T 13/662 701/70 |
| 2010/0256835 A1* | 10/2010 | Mudalige | G08G 1/164 701/2 |
| 2014/0066132 A1 | 3/2014 | Burke et al. | |
| 2014/0244096 A1* | 8/2014 | An | G05D 1/0055 701/25 |
| 2015/0210312 A1 | 7/2015 | Stein et al. | |
| 2016/0139594 A1* | 5/2016 | Okumura | B60W 30/00 701/2 |
| 2016/0264122 A1 | 9/2016 | Gauthier | |
| 2016/0282127 A1 | 9/2016 | Goto | |
| 2016/0334230 A1 | 11/2016 | Ross et al. | |
| 2017/0168485 A1* | 6/2017 | Berntorp | G05D 1/0217 |
| 2017/0278323 A1 | 9/2017 | Gupta et al. | |
| 2018/0050693 A1 | 2/2018 | Al-Deek et al. | |
| 2018/0267532 A1 | 9/2018 | Li et al. | |
| 2018/0364700 A1 | 12/2018 | Liu et al. | |
| 2018/0364701 A1 | 12/2018 | Liu et al. | |
| 2018/0364702 A1 | 12/2018 | Liu et al. | |
| 2018/0364703 A1 | 12/2018 | Liu et al. | |
| 2018/0364704 A1 | 12/2018 | Liu et al. | |
| 2019/0258246 A1 | 8/2019 | Liu et al. | |

OTHER PUBLICATIONS

U.S. Appl. No. 15/624,819, filed Jun. 16, 2017, Liu et al.
U.S. Appl. No. 15/624,838, filed Jun. 16, 2017, Liu et al.
U.S. Appl. No. 15/624,839, filed Jun. 16, 2017, Liu et al.
U.S. Appl. No. 15/624,857, filed Jun. 16, 2017, Liu et al.
U.S. Appl. No. 15/161,996, filed May 23, 2016.
U.S. Appl. No. 15/477,833, filed Apr. 3, 2017.
Taxonomy and Definitions for Terms Related to Driving Automation Systems for On-Road Motor Vehicles, SAE International, http://standards.sae.org/j3016_201609/, Sep. 30, 2016 (3 pages).
Autonomous vs. tele-operated: How People perceive human-robot collaboration with HRP-2, https://www.researchgate.net/publication/221473336, DOI: 10.1145/1514095.1514164 • Source: DBLP, Research Gate, Jan. 2009 (3 pages).
U.S. Appl. No. 15/624,802, Liu et al., filed Jun. 16, 2017,
U.S. Appl. No. 15/624,819, Liu et al., filed Jun. 16, 2017.
U.S. Appl. No. 15/624,838, Liu et al., filed Jun. 16, 2017.
U.S. Appl. No. 15/624,839, Liu et al., filed Jun. 16, 2017.
U.S. Appl. No. 15/624,857, Liu et al., filed Jun. 16, 2017.
International Search Report and Written Opinion in International Application No. PCT/US2018/37400 dated Sep. 17, 2018, 12 pages.
Florentine et al., "Pedestrian notification methods in autonomous vehicles for multi-class mobility-on-demand service." Proceedings of the Fourth International Conference on Human Agent Interaction, Oct. 4, 2016, pp. 387-392.
Pendleton et al., "Autonomous golf cars for public trial of mobility-on-demand service." Intelligent Robots and Systems (IROS), 2015 IEEE/RSJ International Conference on Sep. 28, 2018, pp. 1164-1171.
U.S. Appl. No. 16/398,900, filed Jun. 17, 2017, Liu et al.
PCT International Preliminary Report in International Appln. No. PCT/US2018/37400, dated Dec. 26, 2019, 11 pages.
EP Search Report in European Appln. No. 18817796.8, dated May 26, 2020, 10 pages.

* cited by examiner

INTERVENTION IN OPERATION OF A VEHICLE HAVING AUTONOMOUS DRIVING CAPABILITIES

BACKGROUND

On some occasions, such as when a vehicle that has autonomous driving capabilities (an AV) is driving on a road and experiences an event-such as system faults, extreme weather conditions, and temporary detours—it may be useful to have a remotely located person provide assistance.

SUMMARY

In some implementations, the technologies described in this document include a teleoperation system that interacts with an AV system to handle various types of events, some of which may induce risks (e.g., collisions, traffic jams and damages) or may prohibit or inhibit the AV that is part of the AV system from traveling along a planned trajectory. In some examples, to handle the events, the AV system may communicate with a teleoperation system where a teleoperator provides teleoperations to the AV system.

In some cases, the teleoperation system may comprise a client onboard the AV or associated with the AV system and a server remote to the AV or the AV system. In some cases, the client and the server are both onboard the AV. In some applications, the server and the client may be separated into two different computing devices; in some cases, they may be integrated into a single computing device.

In some implementations, a function or a step described as a part of a teleoperation client may be realized as a part of a teleoperation server. Similarly, a function or a step described as a part of a teleoperation server may be realized as a part of a teleoperation client. In some cases, a function or a step can be a part of a teleoperation server and a part of a teleoperation client.

In general, in one aspect, a method comprises: (a) determining that intervention in an operation of one or more autonomous driving capabilities of a vehicle is appropriate; (b) based on the determination, enabling a person to provide information for an intervention; and (c) causing the intervention in the operation of the one or more autonomous driving capabilities of the vehicle. Determining that intervention is appropriate may comprise receiving a request for intervention. Determining that intervention is appropriate may comprise receiving information about a status or environment of the vehicle or a related AV system. The status or the environment of the vehicle may comprise a functionality of a hardware component or software of the vehicle or the AV system.

In some implementations, the information about the status or the environment of the vehicle or the AV system may comprise a signal from a hardware component or software of the vehicle or the AV system. Determining that an intervention is appropriate may comprise analyzing the signal. Analyzing the signal may comprise detecting unexpected data or absence of expected data. Analyzing the signal may comprise evaluating a mismatch between a measured quantity and a model-estimated quantity for the hardware component or software. Analyzing the signal may comprise using pattern recognition to evaluate an abnormal pattern in the signal. The abnormal pattern may be learned by a machine learning algorithm. Analyzing the signal may comprise inferring a malfunction in the hardware component or the software. Analyzing the signal may comprise detecting an unknown object present in the environment of the vehicle. Analyzing the signal may comprise inferring an event that is or will be happening in the environment of the vehicle.

In some implementations, the request may comprise a request initiated by a remote operator. The request may comprise data associated with status or environment of a vehicle or a related AV system. The request may comprise one or more signals from one or more hardware components of the vehicle or a related AV system. The request may comprise one or more signals from one or more software processes of the vehicle.

In some implementations, the method may comprise, based on the determination, causing a fallback intervention in the operation of the one or more autonomous driving capabilities of the vehicle. The fallback intervention may comprise causing the vehicle or a related AV system to enter a fully autonomous driving mode, a semi-autonomous driving mode, or a fully manual driving mode. The fallback intervention may comprise causing the vehicle to operate at a reduced velocity. The fallback intervention may comprise identifying a safe-to-stop location. The fallback intervention may comprise generating a new trajectory to the safe-to-stop location. The fallback intervention may comprise invoking a backup hardware component or a backup software process. The fallback intervention may comprise evaluating functional hardware components or software processes required to operate the vehicle.

In some implementations, determining that intervention is appropriate may comprise evaluating one or more active events associated with the vehicle or a related AV system, or the environment of the vehicle. Evaluating one or more events may comprise merging two or more active events. Enabling the person to provide information for an intervention may comprise maintaining a queue based on one or more determinations that intervention is appropriate. Maintaining the queue may comprise prioritizing an intervention based on one or more of the following: a decision tree, a combinatorial optimization, a machine algorithm, and a past intervention. Enabling the person to provide information for an intervention may comprise allocating the person to provide the information based on availability of the person, and one or more of: (a) time, (b) knowledge of the vehicle, (c) knowledge of the environment of the vehicle, or (d) a language.

In some implementations, enabling the person to provide information for an intervention may comprise presenting an interactive interface to the person. Presenting an interactive interface may comprise presenting a field of view or a bird's-eye of a vision sensor of the vehicle. Presenting an interactive interface may comprise presenting current or past or both perception information. Presenting an interactive interface may comprise presenting current or past or both trajectories. Presenting an interactive interface may comprise presenting current or past or both motion planning information. Presenting an interactive interface may comprise presenting a system diagram of the vehicle, the system diagram comprising one or more hardware components, or one or more software processes, or both.

In some implementations, the information for the intervention may comprise a current location of the vehicle determined by the person. The intervention may comprise treating the current location identified by the person as prior knowledge and using an inference algorithm to update the current location. The intervention may be based on the person identifying a goal location of the vehicle. The intervention may comprise treating the goal location identified by the person as prior knowledge and using an inference algorithm to update the goal location.

In some implementations, the method may include an intervention comprising a trajectory to be found by the person. The intervention may comprise treating the trajectory identified by the person as prior knowledge and using an inference algorithm to update the trajectory. The intervention may comprise one or more trajectory sampling points identified by the person. The intervention may comprise inferring a trajectory or a trajectory segment based on the one or more trajectory sampling points. Inferring a trajectory or a trajectory segment may be based on one or more trajectory primitives. The intervention may comprise concatenating two trajectory segments. Concatenating two trajectory segments may comprise smoothing the trajectory segments and smoothing a speed profile across the trajectory segments. The intervention may comprise specifying one or more un-traversable road segments. The intervention may comprise setting a speed profile. The intervention may comprise treating the speed profile as prior knowledge and using an inference algorithm to update the speed profile.

In some implementations, the intervention may be based on inferring a speed profile by a learning algorithm. The intervention may be based on inferring a steering angle by a learning algorithm. The intervention may comprise enabling, editing or disabling a hardware component or a software process. The intervention may comprise enabling, editing or disabling a subcomponent of a hardware component or a processing step of a software process.

In some implementations, the method may include an intervention comprising overwriting a travel preference or a travel rule. In some implementations, the method may include an intervention comprising editing data, the data comprising one or more of the following: a map, sensor data in the vehicle or a related AV system, trajectory data in the vehicle or a related AV system, vision data in the vehicle or a related AV system, or any past data in the vehicle or a related AV system.

In some implementations, the method may include configuring the vehicle or a related AV system based on a command. Configuring the vehicle or the AV system based on a command may comprise treating the command as prior knowledge and using an inference algorithm to update the command. A command may comprise one or more of the following: a trajectory, a label, a process control, an annotation, and a machine instruction.

In general, in an aspect, a method comprises (a) receiving an intervention request regarding an operation of one or more autonomous driving capabilities of a vehicle; (b) causing a person to interact with the vehicle over a communication channel; and (c) issuing an intervention to configure the operation of the one or more autonomous driving capabilities of a vehicle.

In some implementations, the method may comprise receiving or generating or analyzing information about a status or environment of the vehicle. The information about the status or the environment of the vehicle may comprise a functionality of a hardware component or software of the vehicle. The information about the status or the environment of the vehicle may comprise a signal from a hardware component or software of the vehicle. The information about the status or the environment of the vehicle may comprise presence of unexpected data or absence of expected data. The information about the status or the environment of the vehicle may comprise a mismatch between a measured quantity and a model-estimated quantity for a hardware component or software of the vehicle.

In some implementations, analyzing the information may comprise using pattern recognition to evaluate an abnormal pattern in the information. The abnormal pattern may be learned by a machine learning algorithm. Analyzing the information may comprise inferring a malfunction in the hardware component or the software. Analyzing the information may comprise detecting an unknown object present in the environment of the vehicle. Analyzing the information may comprise inferring an event that is or will be happening in the environment of the vehicle.

In some implementations, the intervention request may comprise a request initiated by the person or a second person. The intervention request may comprise data associated with status or environment of a vehicle or a related AV system. The intervention request may comprise one or more signals from one or more hardware components of the vehicle or a related AV system. The intervention request may comprise one or more signals from one or more software processes of the vehicle.

In some implementations, determining that intervention is appropriate may comprise evaluating one or more active events associated with the vehicle or a related AV system, or the environment of the vehicle. Evaluating one or more events may comprise merging two or more active events.

In some implementations, the method may comprise maintaining a queue of one or more intervention requests. Maintaining the queue may comprise prioritizing an intervention based on one or more of the following: a decision tree, a combinatorial optimization, a machine algorithm, and a past intervention.

In some implementations, the method may comprise allocating the person to interact with the vehicle based on availability of the person, and one or more of: (a) time, (b) knowledge of the vehicle, (c) knowledge of the environment of the vehicle, or (d) a language.

In some implementations, the method may comprise presenting an interactive interface to the person. Presenting an interactive interface may comprise presenting a field of view or a bird's-eye of a vision sensor of the vehicle. Presenting an interactive interface may comprise presenting current or past, or both, perception information. Presenting an interactive interface may comprise presenting current or past, or both, trajectories. Presenting an interactive interface may comprise presenting current or past, or both, motion planning information. Presenting an interactive interface comprises presenting a system diagram of the vehicle, the system diagram comprising one or more hardware components, or one or more software processes, or both.

In some implementations, the method may include an intervention comprising a current location of the vehicle determined by the person; the intervention may comprise treating the current location identified by the person as prior knowledge and using an inference algorithm to update the current location. The intervention may comprise identifying a goal location for the vehicle; the intervention may comprise treating the goal location identified as prior knowledge and using an inference algorithm to update the goal location. The intervention may comprise a trajectory to be found by the person; the intervention may comprise treating the trajectory identified by the person as prior knowledge and using an inference algorithm to update the trajectory. The intervention may comprise one or more trajectory sampling points identified by the person; the intervention may comprise inferring a trajectory or a trajectory segment based on the one or more trajectory sampling points. Inferring a trajectory or a trajectory segment may be based on one or more trajectory primitives. The intervention may comprise concatenating two trajectory segments. Concatenating two trajectory segments may comprise smoothing the trajectory segments and smoothing a speed profile across the trajectory segments. In some implementations, the intervention may comprise specifying one or more un-traversable road segments.

In some implementations, the intervention may comprise setting a speed profile; the intervention may comprise treating the speed profile as prior knowledge and using an inference algorithm to update the speed profile. The intervention may be based on inferring a speed profile by a learning algorithm. The intervention may be based on inferring a steering angle by a learning algorithm. The intervention may comprise enabling, editing or disabling a hardware component or a software process. The intervention may comprise enabling, editing or disabling a subcomponent of a hardware component or a processing step of a software process.

In some implementations, the intervention may comprise overwriting a travel preference or a travel rule. The intervention may comprise editing data, the data comprising one or more of the following: a map, sensor data in the vehicle, trajectory data in the vehicle, vision data in the vehicle, or any past data in the vehicle. Configuring the operation of the one or more autonomous driving capabilities may comprise treating an intervention as prior knowledge and using an inference algorithm to update the intervention for a purpose of the configuration. An intervention may comprise one or more of the following: a trajectory, a label, a process control, an annotation, and a machine instruction.

In general, in an aspect, implementations include a vehicle with autonomous driving capabilities comprising, and the vehicle may comprise (a) steering, acceleration, and deceleration devices that respond to controlling signals from a driving control system to drive the vehicle autonomously on a road network; (b) a monitoring element on the vehicle that generates an intervention request for the vehicle to engage in an intervention with a person; and (c) a communication element that receives a command from the person to the driving control system for the steering, acceleration, and deceleration devices to cause the vehicle to maneuver to a goal location.

In some implementations, the vehicle may comprise a processor that receives information about a status or environment of the vehicle to determine that the intervention is appropriate. The status or the environment of the vehicle may comprise a functionality of a hardware component or software of the vehicle. The information about the status or the environment of the vehicle may comprise a signal from a hardware component or software of the vehicle.

In some implementations, the vehicle may include determining that intervention is appropriate by analyzing the signal. Analyzing the signal may comprise detecting unexpected data or absence of expected data. Analyzing the signal may comprise evaluating a mismatch between a measured quantity and a model-estimated quantity for the hardware component or software. Analyzing the signal may comprise using pattern recognition to evaluate an abnormal pattern in the signal. An abnormal pattern may be learned from a machine learning algorithm. Analyzing the signal may comprise inferring a malfunction in the hardware component or the software. Analyzing the signal may comprise detecting an unknown object present in the environment of the vehicle. Analyzing the signal may comprise inferring an event that is or will be happening in the environment of the vehicle.

In some implementations, the request may comprise a request initiated by a remote operator. The request may comprise data associated with status or environment of a vehicle. The request may comprise one or more signals from one or more hardware components of the vehicle. The request may comprise one or more signals from one or more software processes of the vehicle.

In some implementations, the vehicle may comprise a processor causing a fallback intervention in the driving control system. The fallback intervention may comprise causing the vehicle to enter a fully autonomous driving mode, a semi-autonomous driving mode, or a fully manual driving mode. The fallback intervention may comprise causing the vehicle to operate at a reduced velocity. The fallback intervention may comprise identifying a safe-to-stop location. The fallback intervention may comprise generating a new trajectory to the safe-to-stop location. The fallback intervention may comprise invoking a backup hardware component or a backup software process. The fallback intervention may comprise evaluating functional hardware components or software processes required to operate the vehicle.

In some implementations, the vehicle may comprise a processor evaluating one or more active events associated with the vehicle, or the environment of the vehicle. Evaluating one or more active events may comprise merging two or more active events.

In some implementations, the vehicle may comprise a processor enabling the person to provide information for an intervention comprises maintaining a queue based on one or more determinations that intervention is appropriate. Maintaining the queue may comprise prioritizing an intervention based on one or more of the following: a decision tree, a combinatorial optimization, a machine algorithm, and a past intervention. Enabling the person to provide information for an intervention may comprise allocating the person to provide the information based on availability of the person, and one or more of: (a) time, (b) knowledge of the vehicle, (c) knowledge of the environment of the vehicle, or (d) a language. Enabling the person to provide information for an intervention may comprise presenting an interactive interface to the person. Presenting an interactive interface may comprise presenting a field of view or a bird's-eye of a vision sensor of the vehicle. Presenting an interactive interface may comprise presenting current or past, or both, perception information. Presenting an interactive interface may comprise presenting current or past, or both, trajectories. Presenting an interactive interface may comprise presenting current or past, or both, motion planning information. Presenting an interactive interface may comprise presenting a system diagram of the vehicle, the system diagram comprising one or more hardware components, or one or more software processes, or both.

In some implementations, the intervention may comprise a current location of the vehicle determined by the person. The intervention may comprise treating the current location identified by the person as prior knowledge and using an inference algorithm to update the current location.

In some implementations, the intervention may be based on the person identifying a goal location of the vehicle. The intervention may comprise treating the goal location identified by the person as prior knowledge and using an inference algorithm to update the goal location.

In some implementations, the intervention may comprise a trajectory to be found by the person. The intervention may comprise treating the trajectory identified by the person as prior knowledge and using an inference algorithm to update the trajectory.

In some implementations, the intervention may comprise one or more trajectory sampling points identified by the person. The intervention may comprise inferring a trajectory or a trajectory segment based on the one or more trajectory sampling points. Inferring a trajectory or a trajectory segment may be based on one or more trajectory primitives. The intervention may comprise concatenating two trajectory segments. Concatenating two trajectory segments may comprise smoothing the trajectory segments and smoothing a speed profile across the trajectory segments.

In some implementations, an intervention may comprise specifying one or more un-traversable road segments. An intervention may comprise setting a speed profile. An intervention may comprise treating the speed profile as prior knowledge and using an inference algorithm to update the speed profile. An intervention may be based on inferring a speed profile by a learning algorithm. An intervention may be based on inferring a steering angle by a learning algorithm. An intervention may comprise enabling, editing or disabling a hardware component or a software process. An intervention may comprise enabling, editing or disabling a subcomponent of a hardware component or a processing step of a software process. An intervention may comprise overwriting a travel preference or a travel rule. An intervention may comprise editing data, the data comprising one or more of the following: map, sensor data, trajectory data, vision data, or any past data.

In some implementations, the vehicle may comprise a processor configuring the vehicle or a related AV system based on a command. Configuring the vehicle or the AV system based on a command may comprise treating the command as prior knowledge and using an inference algorithm to update the command. A command may comprise one or more of the following: a trajectory, a label, a process control, an annotation, and a machine instruction.

In another aspect, implementations include an apparatus comprising: (a) a processor configured to (1) receive an intervention request regarding operation of a vehicle and (2) extract motion information or perception information from the intervention request, and (b) a display configured to (1) display the motion information or the perception information and (2) allow a user to interact with operation of the vehicle.

In some implementations, an intervention request may comprise a request initiated by a remote operator. An intervention request may comprise data associated with status or environment of the vehicle or a related AV system. An intervention request may comprise one or more signals from one or more hardware components of the vehicle or a related AV system. An intervention request may comprise one or more signals from one or more software processes of the vehicle.

In some implementations, the display may be configured to present an interactive interface comprising a field of view or a bird's-eye of a vision sensor of the vehicle. The display may be configured to present an interactive interface comprising current or past or both perception information. The display may be configured to present an interactive interface comprising current or past or both trajectories. The display may be configured to present an interactive interface comprising current or past or both motion planning information. The display may be configured to present an interactive interface comprising a system diagram of the vehicle, the system diagram comprising one or more hardware components, or one or more software processes, or both.

In some implementations, the apparatus may include a processor that converts one or more interactions from the user into an intervention for the operation of the vehicle. One or more interactions may comprise a current location of the vehicle determined by the user; a processor may treat the current location identified by the user as prior knowledge and uses an inference algorithm to generate an updated current location as an intervention. One or more interactions may comprise a goal location of the vehicle identified by the user; a processor may treat the goal location as prior knowledge and uses an inference algorithm to generate an updated goal location as an intervention. One or more interactions may comprise a trajectory identified by the user; a processor may treat the trajectory as prior knowledge and uses an inference algorithm to generate an updated trajectory as an intervention. One or more interactions comprise one or more trajectory sampling points identified by the person; a processor may infer a trajectory or a trajectory segment based on the one or more trajectory sampling points. A processor may infer a trajectory or a trajectory segment based on one or more trajectory primitives. A processor may concatenate two trajectory segments. Concatenating two trajectory segments may comprise smoothing the trajectory segments and smoothing a speed profile across the trajectory segments. One or more interactions may comprise specifying one or more un-traversable road segments. One or more interactions may comprise setting a speed profile. A processor may treat the speed profile as prior knowledge and use an inference algorithm to generate an updated speed profile as an intervention. A processor may infer a speed profile by a learning algorithm, and the speed profiles may be included in the intervention. A processor may infer a steering angle by a learning algorithm, and the steering angle may be included in the intervention. One or more interactions or an intervention may comprise enabling, editing or disabling a hardware component or a software process. One or more interactions or an intervention comprises enabling, editing or disabling a subcomponent of a hardware component or a step of a software process. One or more interactions or an intervention may comprise overwriting a travel preference or a travel rule. One or more interactions or an intervention may comprise editing data, the data comprising one or more of the following: a map, sensor data in the vehicle or a related AV system, trajectory data in the vehicle or a related AV system, vision data in the vehicle or a related AV system, or any past data in the vehicle or a related AV system. An intervention may comprise one or more of the following: a trajectory, a label, a process control, an annotation, and a machine instruction.

In general, in an aspect, a method comprises: (a) causing a vehicle to drive in an autonomous mode on a road, the vehicle comprising one or more autonomous driving capabilities; (b) receiving an intervention regarding an operation of the one or more autonomous driving capabilities; and (c) analyzing the intervention and configuring one or more hardware components or one or more software processes of the vehicle.

In some implementations, an intervention may comprise a current location of the vehicle; analyzing the intervention may comprise treating the current location in the intervention as prior knowledge and using an inference algorithm to update the current location. An intervention may comprise a goal location; analyzing the intervention may comprise treating the goal location in the intervention as prior knowledge and using an inference algorithm to update the goal location. An intervention may comprise a trajectory; analyzing the intervention may comprise treating the trajectory in the intervention as prior knowledge and using an inference algorithm to update the trajectory. An intervention may comprise one or more trajectory sampling points; analyzing the intervention may comprise treating the one or more trajectory sampling points as prior knowledge and using an inference algorithm to update the one or more trajectory sampling points. Analyzing an intervention may comprise inferring a trajectory or a trajectory segment based on the one or more trajectory sampling points. Inferring a trajectory or a trajectory segment may be based on one or more trajectory primitives. Inferring a trajectory or a trajectory segment may comprise concatenating two trajectory segments. Concatenating two trajectory segments may comprise smoothing the trajectory segments and smoothing a speed profile across the trajectory segments. An intervention may comprise specifying one or more un-traversable road segments. An intervention may comprise inferring or setting a speed profile. Analyzing an intervention may comprise treating the speed profile as prior knowledge and using an inference algorithm to update the speed profile. Analyzing an intervention may comprise inferring a speed profile by a learning algorithm. Analyzing an intervention may comprise inferring a steering angle by a learning algorithm. Analyzing an intervention may comprise enabling, editing or disabling a hardware component or a software process. Analyzing an intervention may comprise enabling, editing or disabling a subcomponent of a hardware component or a processing step of a software process. An intervention may comprise overwriting a travel preference or a travel rule. An intervention may comprise editing data, the data comprising one or more of the following: a map, sensor data in the vehicle or a related AV system, trajectory data in the vehicle or a related AV system, vision data in the vehicle or a related AV system, or any past data in the vehicle or a related AV system.

In general, in an aspect, a method comprises: (a) receiving from a remote operator machine-readable instructions regarding an operation of a vehicle; and (b) configuring the vehicle to execute the machine-readable instructions. The vehicle may comprise one or more autonomous driving capabilities. Machine-readable instructions may represent one or more of the following: a current location, a goal location, one or more trajectories, one or more trajectory sampling points, one or more speed profiles, or one or more un-traversable road segments. Machine-readable instructions may comprise enabling, editing or disabling a hardware component or a software process. Machine-readable instructions may comprise enabling, editing or disabling a subcomponent of a hardware component or a processing step of a software process. Machine-readable instructions may comprise overwriting a travel preference or a travel rule. Machine-readable instructions may comprise editing data, the data comprising one or more of the following: a map, sensor data in the vehicle or a related AV system, trajectory data in the vehicle or a related AV system, vision data in the vehicle or a related AV system, or any past data in the vehicle or a related AV system.

These and other aspects, features, and implementations can be expressed as methods, apparatus, systems, components, program products, methods of doing business, means or steps for performing a function, and in other ways.

These and other aspects, features, and implementations will become apparent from the following descriptions, including the claims.

DESCRIPTION

Figure 1:
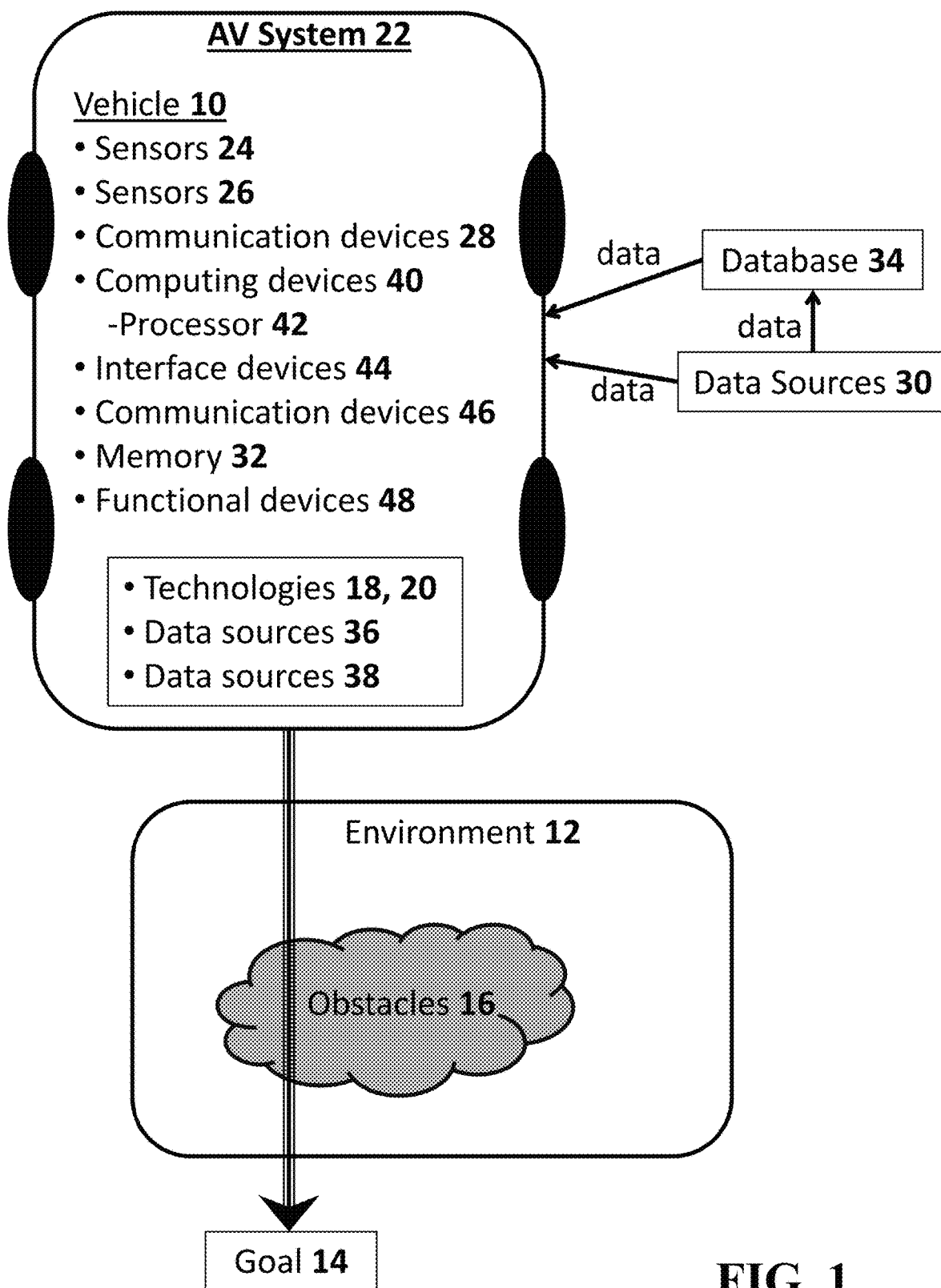
FIG. 1 is a block diagram of an AV system.

The term "autonomous driving capability" is used broadly to include, for example, any function, feature, or facility that can participate in the driving of an AV other than by a person manipulating a steering wheel, accelerator, brake, or other physical controller of the AV.

The term "teleoperation" is used broadly to include, for example, any instruction, guidance, command, request, order, directive, or other control of or interaction with an autonomous driving capability of an AV, sent to the AV or the AV system by a communication channel (e.g., wireless or wired). This document sometimes uses the term "teleoperation command" interchangeably with "teleoperation." Tele-operations are examples of interventions.

The term "teleoperator" is used broadly to include, for example, any person or any software process or hardware device or any combination of them that initiates, causes, or is otherwise the source of a teleoperation. A teleoperator may be local to the AV or AV system (e.g., occupying the AV, standing next to the AV, or one or more steps away from the AV), or remote from the AV or AV system (e.g., at least 1, 2, 3, 4, 5, 10, 20, 30, 40, 50, 100, 200, 300, 400, 500, 600, 700, 900, or 1000 meters away from the AV).

The term "teleoperation event" is used broadly to include, for example, any occurrence, act, circumstance, incident, or other situation for which a teleoperation would be appropriate, useful, desirable, or necessary.

The term "teleoperation request" is used broadly to include, for example, any communication from an AV or an AV system to a teleoperator or other part of a teleoperation system in connection with a teleoperation.

The term "tele-interact" or "tele-interaction" is used broadly to include, for example, any virtual interaction between a teleoperator and a hardware component or a software process of an AV or an AV system.

The term "fallback operation" is used broadly to include, for example, any fashion, form, or method of action, performance, or activity of an autonomous driving capability of an AV after a teleoperation request and before or while a corresponding teleoperation is received and executed by the AV system.

The term "trajectory" is used broadly to include, for example, any path or route from one place to another; for instance, a path from a pickup location to a drop off location.

The term "goal" or "goal position" is used broadly to include, for example, a place to be reached by an AV, including, for example, an interim drop off location, a final drop off location, or a destination, among others.

This document describes technologies applicable to any vehicles that have one or more autonomous driving capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). Vehicles with autonomous driving capabilities may attempt to control the steering or speed of the vehicles. The technologies descried in this document can be applied to partially autonomous vehicles and driver assisted vehicles, such as so called Level 2 and Level 1 vehicles (see SAE International's standard J3016: Taxonomy and Definitions for Terms Related to On-Road Motor Vehicle Automated Driving Systems). One or more of the Level 1, 2, 3, 4 and 5 vehicle systems may automate certain vehicle operations (e.g., steering, braking, and using maps) under certain driving conditions based on analysis of sensor inputs. The technologies described in this document can benefit vehicles in any levels, ranging from fully autonomous vehicles to human-operated vehicles.

AV System

As shown in FIG. 1, a typical activity of an AV 10 is to safely and reliably drive autonomously or partially manually or both through an environment 12 to a goal location 14, while avoiding vehicles, pedestrians, cyclists, and other obstacles 16 and obeying rules of the road (e.g., rules of operation or driving preferences). The features, functions, and facilities of an AV or an AV system that enable the AV to perform the autonomous driving often are referred to as autonomous driving capabilities.

The driving of an AV typically is supported by an array of technologies 18 and 20, (e.g., hardware, software, and stored and real time data) that this document together (and with the AV 10) refers to as an AV system 22. In some implementations, one or some or all of the technologies are onboard the AV. In some cases, one or some or all of the technologies are at another location such as at a server (e.g., in a cloud computing infrastructure). Components of an AV system can include one or more or all of the following (among others).

1. Memory 32 for storing machine instructions and various types of data.
2. One or more sensors 24 for measuring or inferring or both properties of the AV's state and condition, such as the AV's position, linear and angular velocity and acceleration, and heading (i.e., orientation of the leading end of the AV). For example, such sensors can include, but are not limited to: GPS; inertial measurement units that measure both vehicle linear accelerations and angular rates; individual wheel speed sensors for measuring or estimating individual wheel slip ratios; individual wheel brake pressure or braking torque sensors; engine torque or individual wheel torque sensors; and steering wheel angle and angular rate sensors.
3. One or more sensors 26 for sensing or measuring properties of the AV's environment. For example, such sensors can include, but are not limited to: LIDAR; RADAR; monocular or stereo video cameras in the visible light, infrared and/or thermal spectra; ultrasonic sensors; time-of-flight (TOF) depth sensors; speed sensors; and temperature and rain sensors.
4. One or more devices 28 for communicating measured or inferred or both properties of other vehicles' states and conditions, such as positions, linear and angular velocities, linear and angular accelerations, and linear and angular headings. These devices include Vehicle-to-Vehicle (V2V) and Vehicle-to-Infrastructure (V2I) communication devices, and devices for wireless communications over point-to-point or ad-hoc networks or both. The devices can communicate across the electromagnetic spectrum (including radio and optical communications) or other media (e.g., acoustic communications).
5. One or more data sources 30 for providing historical, or real-time, or predictive information, or a combination of any two or more of them about the environment 12, including, for example, traffic congestion updates and weather conditions. Such data may be stored on a memory storage unit 32 on the AV or transmitted to the AV via wireless communications from a remote database 34.
6. One or more data sources 36 for providing digital road map data drawn from GIS databases, potentially including one or more of the following: high-precision maps of the roadway geometric properties; maps describing road network connectivity properties; maps describing roadway physical properties (such as the number of vehicular and cyclist traffic lanes, lane width, lane traffic directions, or lane marker types and locations, or combinations of them); and maps describing the spatial locations of road features such as crosswalks, traffic signs or other travel signals of various. Such data may be stored on a memory storage unit 32 on the AV, or transmitted to the AV by wireless communication from a remotely located database, or a combination of the two.
7. One or more data sources 38 for providing historical information about driving properties (e.g., typical speed and acceleration profiles) of vehicles that have previously traveled along local road sections at similar times of day. Such data may be stored on a memory storage unit 32 on the AV, or transmitted to the AV by wireless communication from a remotely located database 34, or a combination of the two.
8. One or more computing devices 40 located on the AV for executing algorithms (e.g., processes 42) for the on-line (that is, real-time on board) generation of control actions based on both real-time sensor data and prior information, allowing the AV to execute its autonomous driving capabilities.
9. One or more interface devices 44 (e.g., displays, mouses, track points, keyboards, touchscreens, speakers, biometric readers, and gesture readers) coupled to the computing devices 40 for providing information and alerts of various types to, and receiving input from, a user (e.g., an occupant or a remote user) of the AV. The coupling may be wireless or wired. Any two or more of the interface devices may be integrated into a single one.
10. One or more communication interfaces 46 (e.g., wired, wireless, WiMAX, Wi-Fi, Bluetooth, satellite, cellular, optical, near field, or radio, or combinations of them) for transmitting data from a remotely located database 34 to the AV, to transmit sensor data or data related to driving performance to a remotely located database 34, and to transmit communications that relate to teleoperations.
11. Functional devices 48 of the AV that are instrumented to receive and act on commands for driving (e.g., steering, acceleration, deceleration, gear selection) and for auxiliary functions (e.g., turn indicator activation) from the computing devices 40.

Teleoperation System

A teleoperation system, which may be remote or local or a combination of them to the AV or AV system, can enable a teleoperator to interact with the AV system (e.g., providing commands, visualizing a driving condition, and investigating functionality of a hardware component or software process) via a communication channel. The interactions may assist the AV system to adequately respond to various events.

Figure 2A:
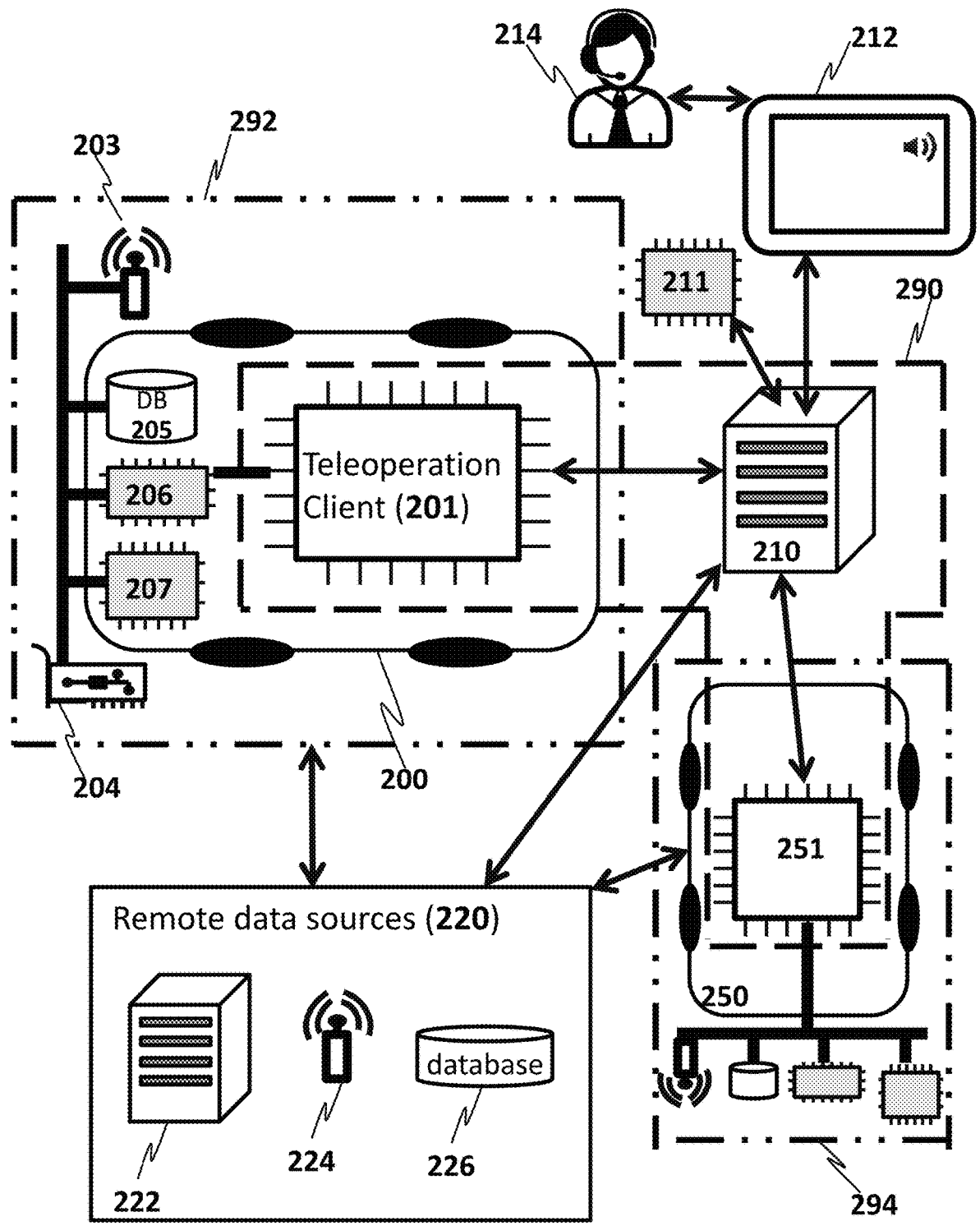
FIGS. 2A and 2B show examples of a teleoperation system.

FIG. 2A illustrates exemplary architecture of a teleoperation system. A teleoperation system 290 may include the following elements (among others):

A teleoperation client 201 (e.g., hardware, software, firmware, or a combination of two or more of them), typically installed on an AV 200 of an AV system 292. The teleoperation client 201 may interact with components (e.g., sensors 203, communication devices 204, user interface devices, memory 206, a controller 207, or functional devices, or combinations of them) of the AV system 292, for example, sending and receiving information and commands. The teleoperation client 201 can communicate over a communication interface 204 (that may be at least partly wireless) with a teleoperation server 210.

A teleoperation server 210, may be located in the AV 200 or in a remote location, for example, at least 0.1, 1, 2, 3, 4, 5, 10, 20, 30, 40, 50, 100, 200, 300, 400, 500, 600, 700, 900, or 1000 meters away from the AV 200. The teleoperation server 210 communicates with the teleoperation client 201 using the communication interface 204. In some implementations, the teleoperation server 210 can communicate simultaneously with multiple teleoperation clients; for example, the teleoperation server 210 communicates with another teleoperation client 251 of another AV 250 that is part of another AV system 294. The clients 201 and 251 may communicate with one or more data sources 220 (e.g., a central server 222, a remote sensor 224, and a remote database 226 or combinations of them) to collect data (e.g., road networks, maps, weather, and traffics) for implementing autonomous driving capabilities. The teleoperation server 210 may also communicate with the remote data sources 220 for teleoperations for the AV system 292 or 294 or both.

A user interface 212 presented by the teleoperation server 210 for a human teleoperator 214 to engage in teleoperations for the AV system 200. In some cases, the interface 212 may render to the teleoperator 214 what the AV system 200 has perceived or is perceiving. The rendering may be based on real sensor signals or based on simulations. In some implementations, the user interface 212 may be replaced by an automatic intervention process 211 that makes any decisions on behalf of the teleoperator 214.

Figure 2B:
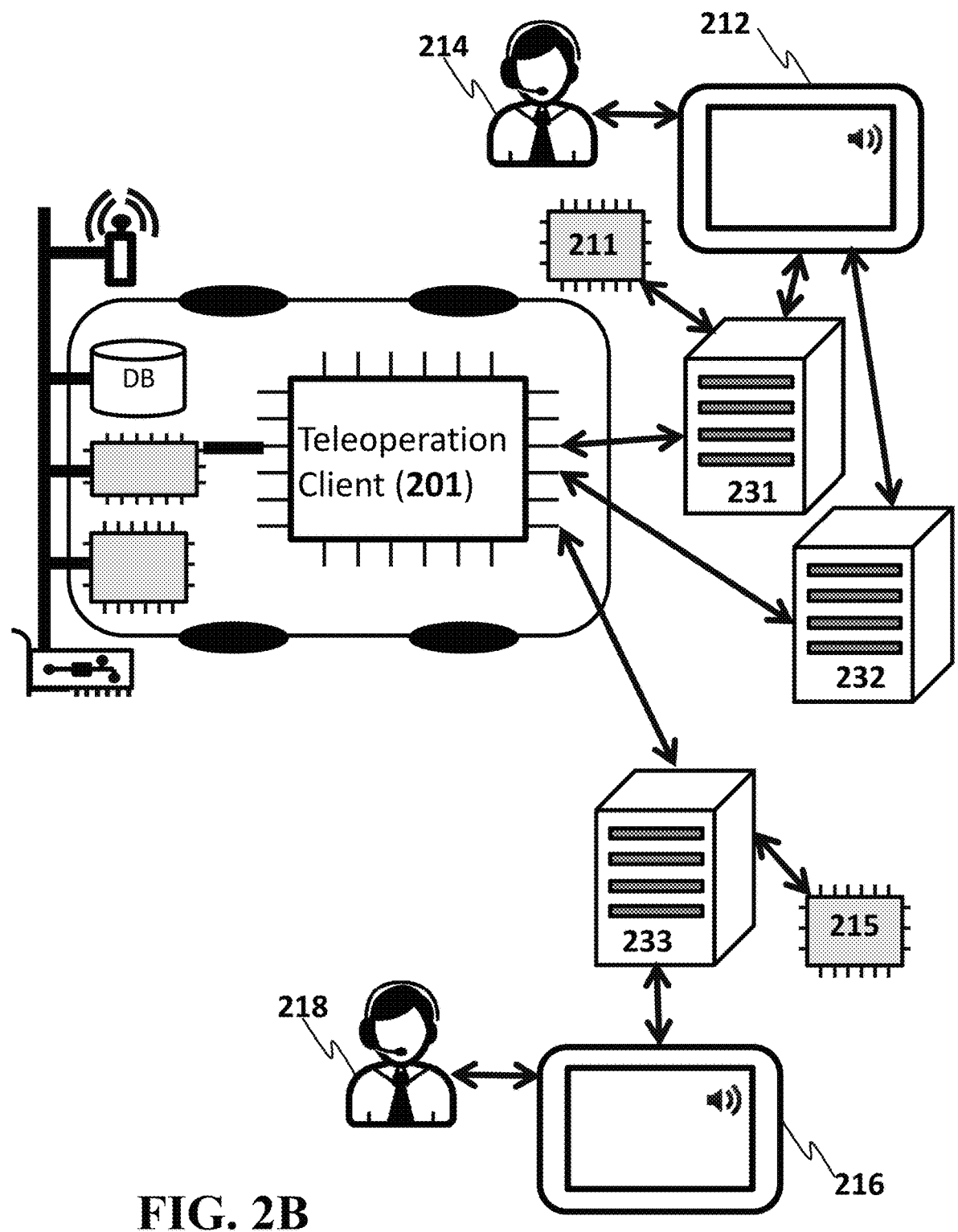

Referring to FIG. 2B, in some implementations, a teleoperation client 201 may communicate with two or more teleoperation servers 231 and 232, where the servers send and aggregate various information for a single teleoperator 214 to conduct a teleoperation session on a user interface 212. In some cases, a teleoperation client 201 may communicate with two or more teleoperation servers (e.g., 231 and 233), which present individual user interfaces (e.g., 212 and 216) to different teleoperators (e.g., 214 and 218), allowing the two or more teleoperators (e.g., 214 and 218) to jointly participate in a teleoperation session. In some cases, automatic processes 211 and 215 may automate teleoperation on behalf of the interfaces (e.g., 212 and 216) and teleoperators (e.g., 214 and 218).

Figure 3A:
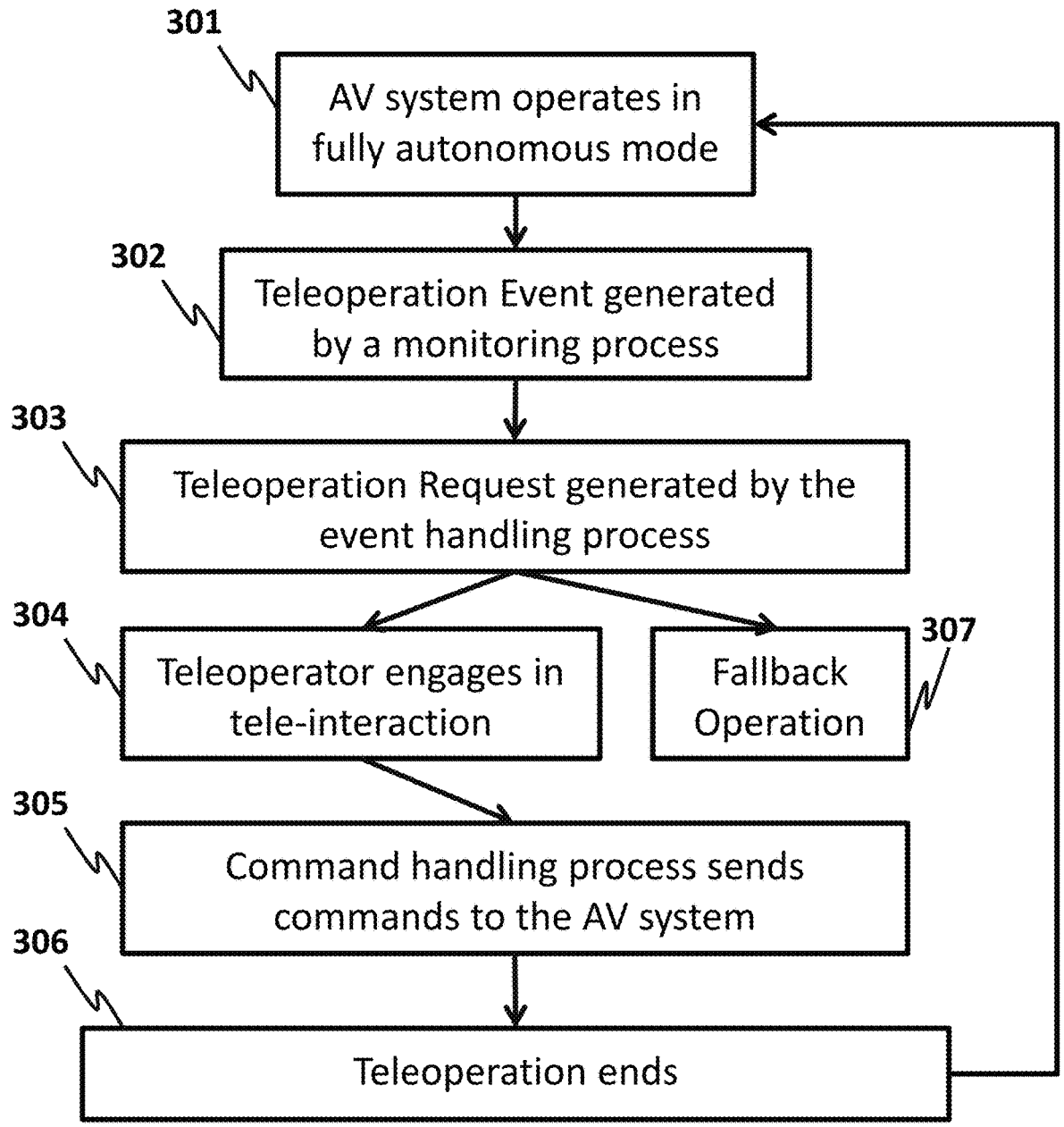
FIGS. 3A and 3B show examples of a teleoperation client.
Figure 3B:
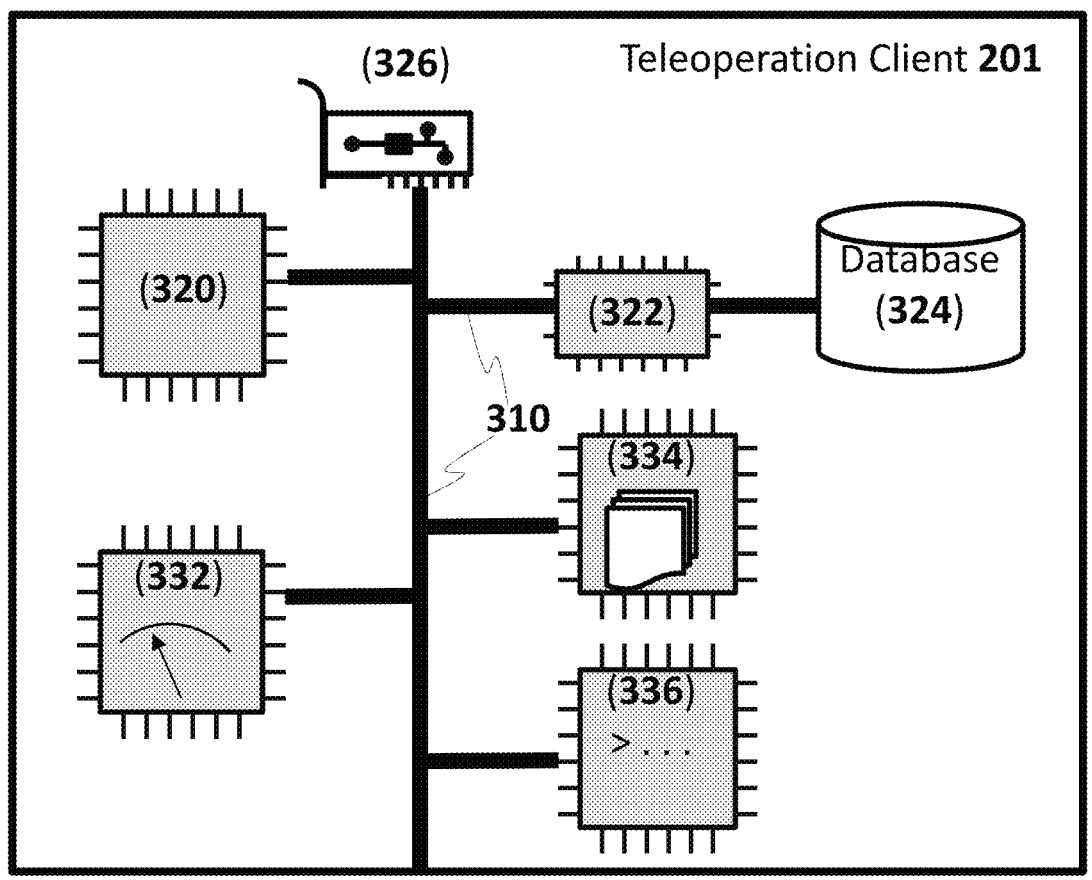

FIG. 3A shows an exemplary flow chart of a teleoperation system 290. FIG. 3B shows an exemplary architecture of a teleoperation client 201, which may be software loaded on memory 322 being executed by a processor 320, or may be hardware comprising one or more of the following: a data bus 310, a processor 320, memory 322, a database 324, and a communication interface 326. Referring FIG. 3A, in an initial condition 301, an AV system operates in a fully autonomous mode (that is, driving without manual assistance). In step 302, a teleoperation event is generated by a monitoring process (332 in FIG. 3B) on the AV system. In some implementations, this begins the teleoperation. In step 303, based on the generated teleoperation event, a teleoperation request is generated by an event handling process (334 in FIG. 3B), which requests the teleoperation system to begin a tele-interaction with the AV system. In response to the request, the teleoperation system 290 may allocate an available teleoperator and present the teleoperation request to the teleoperator. In some cases, the teleoperation request may comprise information (e.g., a planned trajectory, a perceived environment, a vehicular component, or a combination of them, among other things) of the AV system. Meanwhile, while awaiting a teleoperation to be issued by the teleoperator, the AV system may implement a fallback operation 307.

In step 304, the teleoperator accepts the teleoperation request and engages in the tele-interaction. The tele-interactions can vary; for example, the teleoperation server may recommend possible teleoperations through an interface to the teleoperator, and the teleoperator can select one or more of the recommended teleoperations and cause the teleoperations to be sent to the AV system. In some implementations, the teleoperation server renders an environment of the AV system through a user interface to the teleoperator, and the teleoperator can see the environment to select an optimal teleoperation. In some cases, the teleoperator may enter computer codes as a teleoperation. In some examples, the teleoperator uses the interface to draw a recommended trajectory for the AV along which to continue its driving.

Based on the tele-interaction, the teleoperator may issue a suitable teleoperation, which is then processed by a teleoperation handling process (336 in FIG. 3B). In step 305, the teleoperation handling process sends the teleoperation to the AV system to affect the autonomous driving capabilities of the AV. In step 306, once the AV system completes the execution of the teleoperation or aborts the teleoperation? or the teleoperation is terminated by the teleoperator, the teleoperation ends. The AV system may return to the autonomous mode 301 and the AV system listens for another teleoperation event.

Teleoperation Client

Figure 4A:
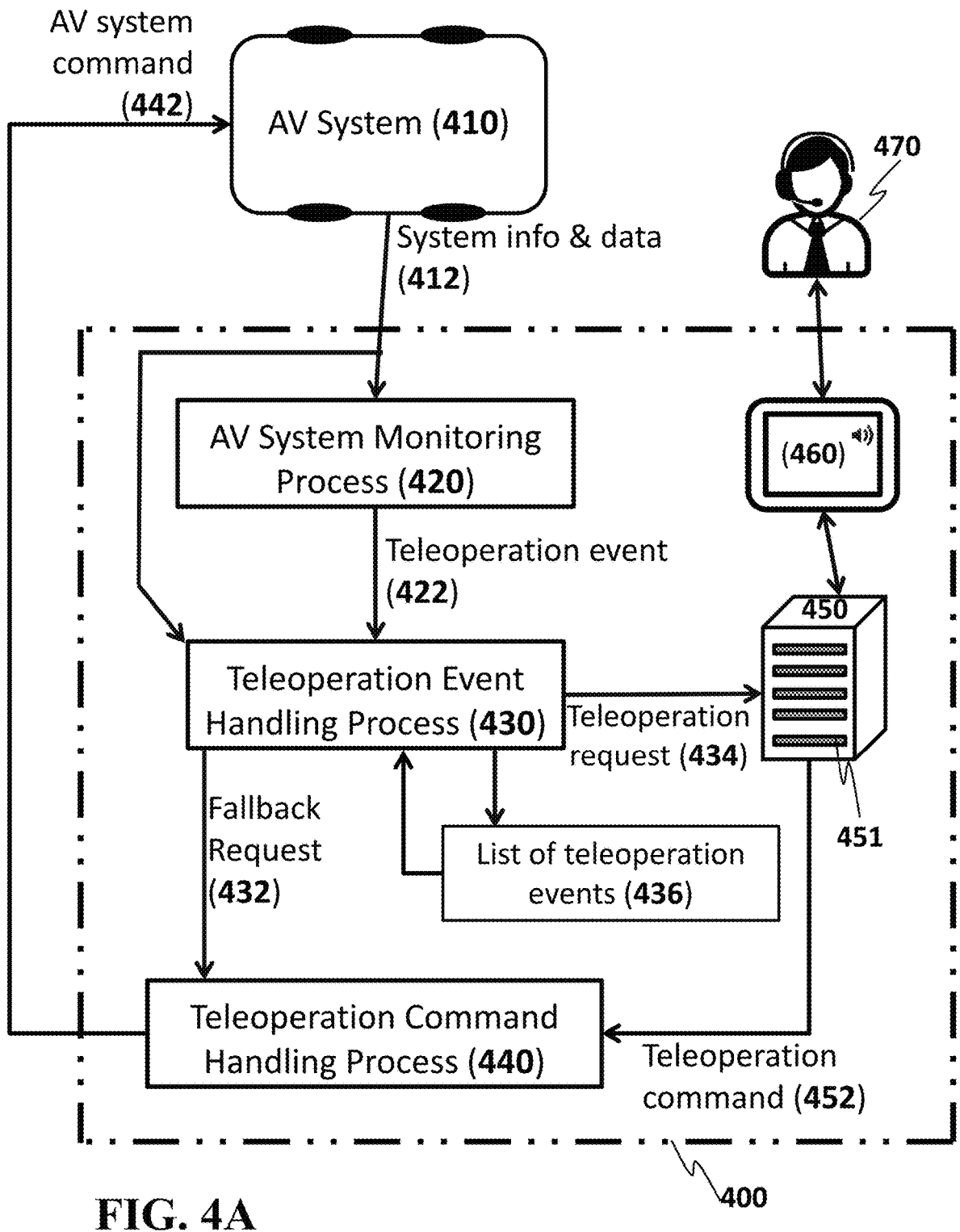
FIGS. 4A and 4B show examples of a teleoperation flowchart.

FIG. 4A shows an exemplary flowchart of a teleoperation client 201. In some implementations, the teleoperation client 201 can be integrated as a part of an AV system 410. In some examples, the teleoperation client 201 is distinct from the AV system 410 and maintains communication with the AV system 410. In some instances, the teleoperation client 201 may comprise an AV system monitoring process 420, a teleoperation event handling process 430, and a teleoperation command handling process 440. The AV system monitoring process 420 may read system information and data 412 for analysis. An analysis result may generate a teleoperation event 422 to the teleoperation event handling process 430. The teleoperation event handling process 430 may send out a teleoperation request 434 to a teleoperation server 450 and a fallback request 432 to the teleoperation command handling process 440. In some implementations, the teleoperation server 450 may present a user interface 460 for a teleoperator 470 to perform tele-interaction with the AV system 410. In response to actions of the teleoperator through the user interface, the teleoperation server may issue a teleoperation command 452 that expresses the teleoperation in a form for use by the teleoperation command handling process 440. The teleoperation command handling process 440 translates the teleoperation command into an AV system command 442 expressed in a form useful for the AV system 410 and sends the command to the AV system.

AV System Monitoring Process.

The AV system monitoring process 420 may receive system information and data 412 to monitor the operation status (e.g., velocity, acceleration, steering, data communications, perception, and trajectory planning) of the AV system 410. The operation status may be based on directly reading outputs of hardware components or software processes or both of the AV system 410, or indirectly inferring, e.g., computationally or statistically, the outputs by measuring associated quantities, or both. In some implementations, the AV system monitoring process 420 may derive information (e.g., computing a statistic, or comparing monitored conditions with knowledge in a database) from the operation status. Based on the monitored operation status or derived information or both, the monitoring process 420 may determine a teleoperation event 422 for which a teleoperation 452 ought to be generated.

When one or more components of the AV system 22 (FIG. 1) is in an abnormal or unexpected condition (e.g., malfunctions or generates an unusual output), a teleoperation event (422 in FIG. 4A) may be triggered. For instance, a brake malfunctions; a flat tire occurs; the field of view of a vision sensor is blocked; a frame rate of a vision sensor drops below a threshold; an AV system's movement does not match with a current steering angle, a throttle level, a brake level, or a combination of them; a fault software code; a reduced signal strength; an increased noise level; an unknown object perceived in the environment of the AV system; a motion planning process is unable to find a trajectory towards the goal due to a planning error; inaccessibility to a data source (e.g., a database, a sensor, and a map data source); or combinations of them.

In some implementations, a teleoperation event (422 in FIG. 4A) may be triggered upon an even or a request. Examples include: a detour, a protest, a fire, an accident, a flood, a fallen tree or rock, a medical emergency, a police request, a request by an occupant in the AV (e.g., a passenger does not like driving behaviors of the AV system), a request by a user of the AV (e.g., a package sender using the AV system to ship packages wants to change a new trajectory or a destination), or initiation by a teleoperator, or combinations of them.

A teleoperation event 422 generated by the AV system monitoring process 420 may comprise one or more of the following items of information:

1. One or more outputs from hardware components or software processes of the AV system 410, e.g., video streams from a camera, signals of a sensor (e.g., LIDAR, and a radar), tracked objects from a perception system, dynamic quantities (e.g., velocity and orientation) of the AV system, throttle levels, brake levels, or a trajectory identified by a motion planning process, or combinations of them.
2. Status of hardware components and or software processes of the AV system 410, e.g., a failure in sensor operations, a heavy load in a motion planning process, a long queue, or a long time in a decision making process. The status information may be used for determining an applicable teleoperation.
3. Relationships between measurements and estimates or thresholds. For example, the number of feasible trajectories towards a goal is smaller than a threshold (e.g., 1, 2, 3, 4, 5 or 10). The number of unknown objects perceived in an environment near the AV system is larger than a threshold (e.g., 0, 1, 2, 3, 4, 5, 6, 7, 8, 9, or 10). A confidence level of a variable (e.g., a signal intensity, a velocity, an orientation, a data rate, a distance to a perceived object, or a geolocation position) drops below a certain threshold (e.g., 100%, 95%, 90%, 85%, 80%, 75%, 70%, 65%, 60%, 55%, or 50%). The deviation of a measured quantity from an estimate is beyond a threshold (e.g., at least 1%, 2%, 3%, 4%, 5%, 10%, 15%, 20%, 25%, 30%, 35%, 40%, 45% or 50%). The deviation may be set deterministically or inferred probabilistically by a machine learning approach.
4. Absence of certain data from the AV system 410 or from other data sources or both, such as map data, sensor data, connectivity data, GPS data, infrastructure data, or vehicle-to-vehicle data.
5. Presence of certain data from the AV system 410 or from other data sources or both, such as an unexpected occupant in the AV, an unexpected login into the AV system, or unexpected data injected into the AV system 410.
6. Presence of a request, such as a request for teleoperation assistance made by an occupant of the AV or a user of the AV system 410.
7. A hazardous condition in the AV system 410 or in the environment of the AV system 410. Examples include a fire, a flat tire, a bomb.
8. Known facts regarding the AV system 410 or the environment of the AV system 410. Examples include: any objects perceived in the past or current environment of the AV system 410; any past, current or future travel rules; any past, current or future trajectories; a construction zone; and a lane shift.
9. Unrecognizable matters. Examples include: a detected object in the past or current environment of the AV system 410 cannot be recognized by the AV system 410; any past, current or future travel rules cannot be interpreted by the AV system 410; any past, current or future trajectories cannot be planned; and an interference (e.g., a construction zone and a detour) on a road segment.

The existence of circumstances suggesting the occurrence of an event need not be based on explicit information from the AV system 410 but can be inferred. For example, in some implementations, the AV system monitoring process 420 may determine or infer a failure in the AV system 410 by pattern recognition. For example, one or more signal values received from the AV system 410 that are out of a specified pattern may be determined as a system failure. Patterns can be hand-crafted or deduced from data via machine learning approaches such as re-enforcement learning or deep learning.

In some implementations, the AV system monitoring process 420 may detect a failure in the AV system 410 by a model-based approach. A model of the monitored hardware component or software process is constructed and a current state of the model is estimated using past inputs or past measurements. When a measurement associated with the current state deviates from its estimate, a system failure may occur. For example, dynamic quantities (e.g., velocity and orientation) of the AV with respect to throttle and steering commands is described in a dynamics model, and the monitoring process 420 uses the dynamics model to estimate the dynamic quantities at time t based on the throttle and steering commands at time t−1. When the measured dynamic quantities at time t differ from the estimated dynamic quantities by at least 1%, 2%, 3%, 4%, 5%, 10%, 15%, 20%, 25%, 30%, 35%, 40%, 45% or 50%, the monitoring process 420 determines a system failure. A model may be hand-designed or identified using system identification approaches or learned using machine learning approaches (e.g., neural networks).

Figure 4B:
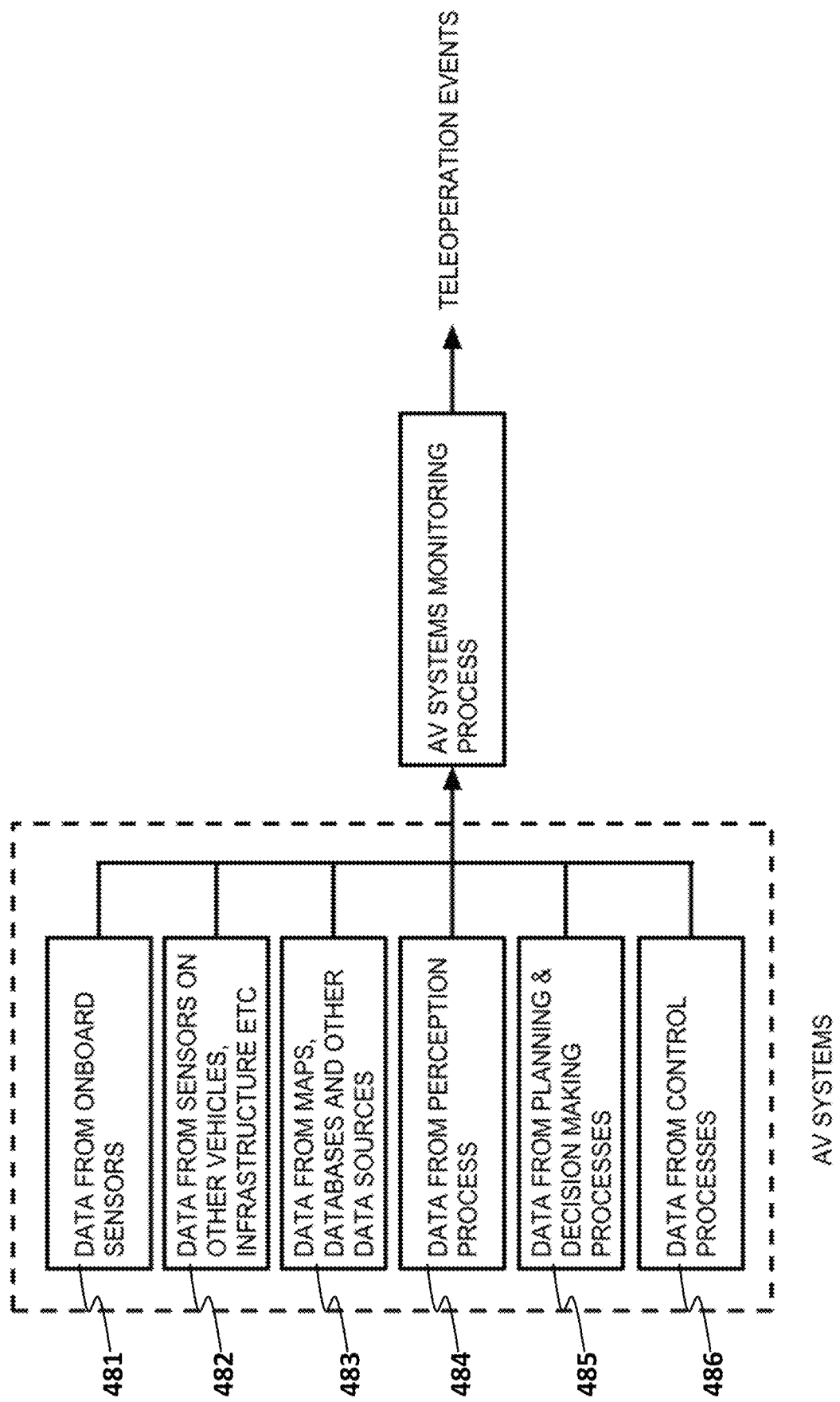

FIG. 4B illustrates examples of teleoperation events triggered by data from various data sources and their relevance to teleoperation as follows.

1. Data from a sensor onboard the AV (481). For example, no image may have been sent from a certain vision sensor during a certain period of time, indicating that the vision sensor is no longer functional. This may impact the AV system's ability to avoid or stop for an obstacle in the view of the vision sensor.
2. Data from sensors off board the AV, e.g., from other vehicles and infrastructure (482). For example, the AV system may receive notification from a nearby emergency vehicle and be expected to make way to yield to the emergency vehicle. The teleoperator may assist the AV system to find an appropriate stopping position on the side of the road.
3. Data from maps, databases, and other data sources (483). For example, the AV system may have reached a dedicated teleoperation area marked on the map, e.g., an area where deference by the AV system to teleoperations from a teleoperation system is required. The AV system should find an appropriate stopping location and await teleoperations.
4. Data from a perception process of the AV system (484). For example, a perception process may detect an unknown object present on the planned trajectory of the AV. The AV system may stop for the object and await a teleoperator's assistance in classifying the object.
5. Data from a motion planning process of the AV system (485). For example, the motion planning process may not have been able to find a feasible trajectory to the goal for a certain amount of time. A teleoperator can manually assign a trajectory to move the AV system forward to the goal.
6. Data from a control process of the AV system (486). For example, a controller of the AV system may have experienced a failure that leads the AV system to not be drivable. The teleoperator may notify an emergency service provider to tow the AV.
7. Data from a government agency. For example, data from a police office may show that a road segment is closed.
8. Mismatch on data. For example, a perceived road segment is different from the information provided by a map.

Teleoperation Event Handling Process.

Referring again to FIG. 4A, after the teleoperation event handling process 430 receives the teleoperation event 422, it may use the teleoperation event 422 or system information and data 412 or both to derive important features (e.g., safety, malfunctioning), which may be included in a teleoperation request 434. Examples of important features are as follows.

1. Current operation status of a hardware component or a software process of the AV system 410, which can be a binary measurement (e.g., indicating functional or not), a category measurement or a numerical scale, or combinations of them.
2. Active teleoperation events, which include a list of teleoperation events for which teleoperations are being requested or are being handled under teleoperation or both. For example, a motion planning process of the AV system 410 may fail to find a feasible trajectory to the goal, and a first teleoperation event has been generated. While awaiting a teleoperation from a teleoperator in response to that request, the AV system may perceive an ambulance coming and a second teleoperation event is generated that triggers a second teleoperation request to a teleoperator to guide the AV system how to yield the ambulance. The first and the second teleoperation events may be placed into the list of active teleoperation events 436. The first and the second teleoperation events may be consolidated because they share a similar cause: failure of the motion planning process. In other words, when two or more teleoperation events 422 are generated, the teleoperation event handling process 430 may consolidate some of the teleoperation events 422. A merit of the consolidation is to let the teleoperator 470 handle similar teleoperation events together.
3. Perceived data about an environment near the AV system 410, for example, obstacles perceived by a perception process, or video streams from a camera.

The teleoperation event handling process 430 may generate a fallback request 432 and send it to the teleoperation command handling process 440. The fallback request 432 specifies one or more fallback operations for the AV system 410 to implement in response to the teleoperation events 422 while waiting for one or more teleoperations 452. Examples of fallback operations are described as follows.

1. The AV system may remain in a fully autonomous driving mode, or may allow or request a person to assist in a semi-autonomous driving mode or to take over driving in a fully manual driving mode (that is, one in which no autonomous driving capability is active).
2. The AV system may maintain a nominal (e.g., current) velocity or reduce the driving velocity.
3. The AV system may continue following a current trajectory towards the goal. In some cases, the AV system may plan a new trajectory from its current location to a safe-to-stop location (e.g., a parking lot, an empty space on the side of the road, an emergency lane, a shoulder, a green space, and an AV service center). The AV system may maneuver the AV along the new trajectory with the capability to stop to avoid a traffic jam or accident or hitting an object (e.g., another vehicle or a pedestrian). (Additional information about such a maneuver is found in U.S. patent application Ser. No. 15/477,833, filed Apr. 3, 2017 and incorporated here by reference.)
4. The AV system may invoke a backup system. For instance, a cellular communication system may be out of order, and a satellite communication system can then be invoked; a high-resolution sensor may malfunction and a low-resolution sensor may be invoked, where a sensor may include a radar, a LIDAR, a camera, or a video recorder; a remote database (e.g., map data) may become inaccessible real-time, and an in-vehicle database may be invoked for the purpose.
5. The AV system may apply a driving model trained in a past condition (e.g., a geographic region, a day time, an evening time, and a peak time) to a new condition. For instance, a driving model created based on the environment in town A may be applied to driving in town B; a driving model created based on the daytime may be applied to driving in the evening or night.

6. The AV system may not be allowed to perform certain travel preferences. For example, a fallback operation may disallow the AV system to pass another vehicle.

In some implementations, a fallback request 432 may, for example, specify one or more of the following (and a wide variety of other actions and operations and combinations of them): keep traversing the current planned trajectory autonomously; change the goal to an AV service center and re-plan the trajectory to the new goal based on autonomous driving; follow autonomously the current trajectory with a slower velocity; re-plan a trajectory to stop at the closest location that is safe to stop; or autonomously decelerate until stopped.

Each fallback operation can have two main attributes: one or more required system processes (e.g., minimum required onboard processes) and a cost (e.g., a computed cost) of the fallback operation. Examples of system processes include maneuvering, data communications, database access, motion planning, perception, or sensing, or combinations of them. A cost represents how much the fallback operation deviates from a nominal autonomous driving mode. For example, an AV system without failure may drive at a nominal velocity (e.g., 40 mph); when a failure process occurs, a fallback request to keep traversing autonomously the current planned trajectory with a reduced velocity (e.g., 20 mph) may not need to invoke a motion planning process but may require at least perception and sensing processes so that the AV system can avoid hitting objects. The cost of this example may comprise how much the velocity is reduced from the nominal velocity of the AV system typically driving on the same road, and how much perception accuracy the AV system will sacrifice when executing the perception and sensing processes without invoking the motion planning process.

A cost of a fallback operation may be described, for example, as a function of the fallback operation, the teleoperation event, and the current operation status of the AV system. When a fallback request specifies two or more fallback operations, the costs of individual fallback operations are added, or weighted-summed. The selection of one or more appropriate fallback operations may be based on priority. Some implementations may utilize a decision tree to determine a hierarchy of the selection. In some implementations, the selection of one or more appropriate fallback operations to be included in the fallback request can be based on solving a combinatorial optimization problem. Some implementations of the selection may be based on a machine learning approach, where the best fallback operation or an optimal set of fallback operations is inferred from a database. The database may comprise past selections in various teleoperation events.

When receiving a teleoperation event, the teleoperation event handling process 430 may initialize a list of fallback operations from which to make its selection, and remove the fallback operations that cannot invoke required system processes or whose cost is beyond a threshold or both. When two or more fallback operations remain on the list, the one with the least cost may be selected. For example, a first fallback operation for which the AV system would traverse a new trajectory to a safe stopping place may require processes of sensing, perception, motion planning, and maneuvering to be functional. A second fallback operation for which the AV system immediately starts to slow down to a stop along an existing trajectory may require the maneuvering process to be operational. If all the required processes of the two fallback operations remain functional, their costs are compared to determine which fallback operation should be executed. If the motion planning process of the AV system is out of order, the second fallback operation would be chosen since the first fallback operation is infeasible.

The teleoperation event handling process 430 may send a teleoperation request 434 to the teleoperation server 420. When the teleoperation request 434 arrives at the teleoperation server 450, the server may place the teleoperation request 434 in a queue 451 to allocate an available human teleoperator 470. When the allocated teleoperator 470 becomes available, the teleoperation request 434 is presented on a teleoperation interface 460 to the teleoperator 470. Allocating teleoperators 470 to teleoperation requests 434 may be based on one or more of the following: time (e.g., peak or non-peak hours, seasons, day time, and night time), knowledge of or experience with the vehicle (e.g., vehicle make and model), or knowledge of or experience in the neighboring environment of the vehicle (e.g., country, state, city, town, street, and landmarks) and a language to be used (e.g., an oral communication may be used between a teleoperator and a user of the AV system; a sequence of texts may be presented to a user of the AV system).

The teleoperation request 434 may comprise one or more of the following: relevant information about an AV system failure or other condition, AV system information and data 412, the teleoperation event 422, important features, currently active teleoperation events, one or more teleoperations, and data of the AV system associated with each active teleoperation event.

The teleoperation event handling process 430 may initialize on a client or on the server 450, or both, a list of potential teleoperations. Each potential teleoperation is associated with one or more (e.g., required) hardware components or software processes or both. Potential teleoperations that have unmet requirements may be removed from the list. For example, on a teleoperation server 450, a teleoperator 470 may tele-interact with the AV system 410 through the teleoperation system and issue a teleoperation command 452 comprising a new trajectory, which may require the maneuver process and the perception process to be operational so that the AV system 410 can drive along the specified trajectory without hitting any object. The remaining potential teleoperations on the list may be ranked based on how easy they are for the teleoperator 470 to tele-interact with the AV system 410 with respect to current active teleoperation events. A tele-interaction able to address more active teleoperation events is ranked higher.

The teleoperator 470 may review the information on the interface 460 and issue one or more teleoperation commands 452. A teleoperation command 452 may be expressed at one or more levels. For example, a high-level command may be expressed in a spoken natural language, or a written natural language, or both, for example "turn right, go straight, and make a u-turn". A middle-level command may be expressed as an alphanumeric string, for example, "a001, b005, a003", where a001 is a code representing turning right, b005 representing going straight, and a003 representing making a u-turn. A low-level command may be expressed as machine instructions, for example,

```
for a = 1: 90
    right-turn 1 degree;
    a++;
end
for t = 1:1000
    go straight;
    t++;
```

```
    end
    for c = 1:180
        left-turn 1 degree;
        c++;
    end
```

Regardless of the level, the teleoperation command 452 may comprise a description of a behavior of the AV system 410, or one or more steps to be executed by the AV system 410, or both. When the teleoperation command handling process 440 receives the teleoperation command 452, it converts it into AV system commands 442 for controlling and maneuvering the AV system.

An AV system command 442 in general comprises machine instructions, for example, expressed in an assembly language or a low-level language, e.g., C/C++. When a teleoperation command 452 is expressed in a high-level language, such as a natural language, the teleoperation command handling process 440 may convert the teleoperation command 452 into machine instructions for the AV system 410.

Teleoperation Command Handling Process.

The teleoperation command handling process 440 handles fallback requests from the teleoperation event handling process 430 based on one or more teleoperation events 422, teleoperation commands 452 issued by the teleoperator 470 via the teleoperation interface 460, or both. In some implementations, a difference (e.g., a conflict) may exist between a fallback request 432 and a teleoperation command 452. For example, a fallback request 432 may ask the AV system 410 to operate at a reduced velocity along an existing trajectory, but simultaneously the teleoperation command 452 may ask the AV system 410 to operate at a nominal speed along a new trajectory. Thus, the teleoperation command handling process 440 has to mediate the difference to make sure the AV system 410 drives safely during a transition between a fallback operation and a teleoperation.

In some implementations, the teleoperator 470 may initiate a tele-interaction without a teleoperation request 434 having been generated. The teleoperator 470 may independently initiate a teleoperation command 452 to the teleoperation command handling process 440. For example, a weather condition may change from sunny to snowy, and the teleoperator may request the AV system 410 to drive back to an AV service center although the AV system monitoring process 420 has not generated any teleoperation event 422 in response to the weather change.

The teleoperation command handling process 440 takes a teleoperation command 452 issued by a teleoperator 470 through a teleoperation interface 460 and translates the teleoperation command 452 into one or more AV system commands 442. The AV system commands 442 are then sent to corresponding hardware components or software processes of the AV system 410.

Teleoperation Server

In FIG. 4A, a teleoperation system 400 comprises a teleoperation server 450, which may present an interface 460 to allow a teleoperator 470 to tele-interact with the AV system 410 through the teleoperation system. The teleoperation system 400 enables different types of tele-interactions for the teleoperator 470 to interact with the AV system 410 and affect the AV system's behavior, e.g., affect one or more of the autonomous driving capabilities.

When a teleoperation server 450 receives a teleoperation request 434, the teleoperation server 450 analyzes the teleoperation request 434 and the associated data, such as relevant information of a system failure, system information and data 412, the teleoperation event 422, important features, currently active teleoperation events, one or more teleoperations, or data of the AV systems associated with each active teleoperation event, or combinations of them. The teleoperation server 450 may present corresponding information to the teleoperator 470.

Figure 5:
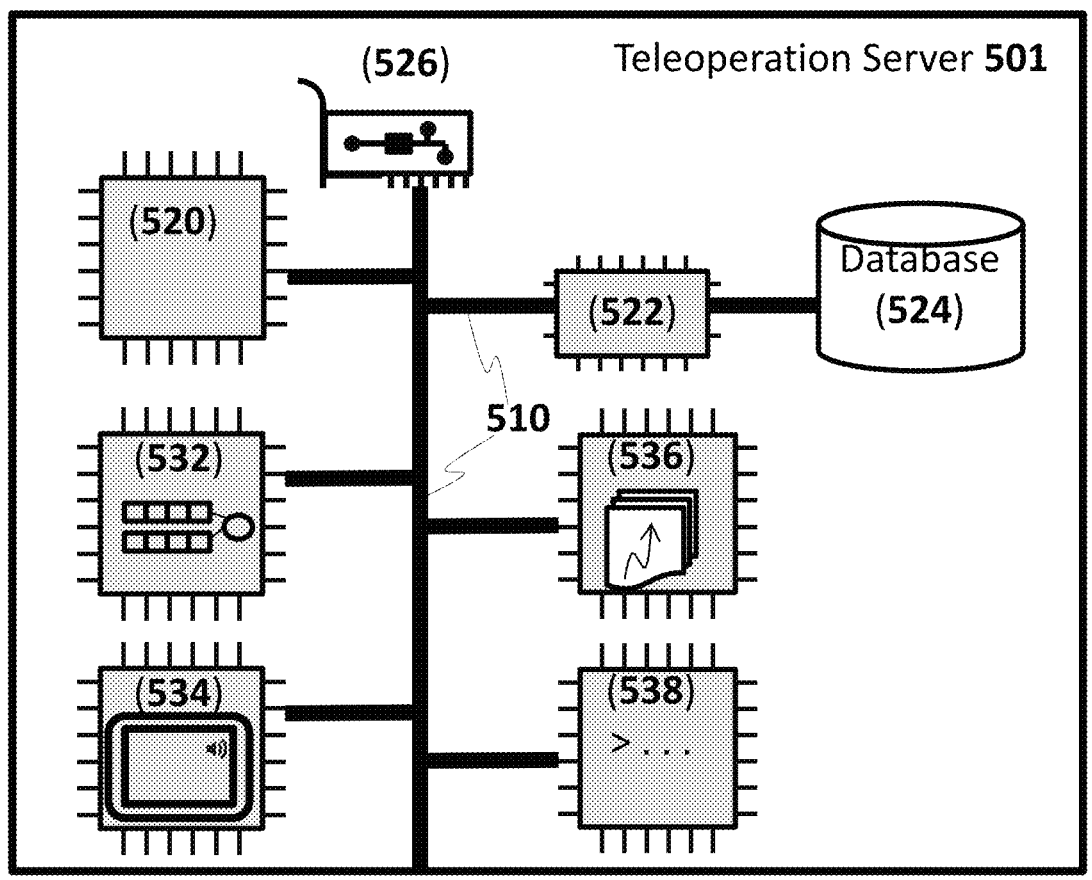
FIG. 5 shows an example of a teleoperation server.

FIG. 5 shows an exemplary architecture of a teleoperation server 501, which may comprise software loaded on memory 522 being executed by a processor 520, or may be hardware comprising one or more of the following: a data bus 510, a processor 520, memory 522, a database 524, and a communication interface 526.

When a teleoperation request arrives at the communication interface 526 of the teleoperation server, the teleoperation request may be handled by a queuing process 532. In some implementations, the queuing process 532 may consider a first-in first-out method. In some cases, the queuing process 532 may evaluate the urgency of the teleoperation request, and then prioritize the urgent teleoperation request. A degree of urgency may be associated with safety. For example, an event that an AV system is under a fire may be placed with a high degree of urgency; a flat tire occurrence where the AV system has been parked in a safe place may be placed with a low degree of urgency.

Prioritizing a teleoperation request may utilize a decision tree to determine a hierarchy of existing teleoperation requests. In some implementations, prioritization can be based on solving a combinatorial optimization problem. Some implementations of the prioritization may be based on a machine learning approach analyzing a database; the database may comprise past teleoperation requests.

The teleoperation server 501 may comprise an interface manager 534, which renders content for a teleoperator to conduct a tele-interaction session. The teleoperator may conduct the tele-interaction on trajectory planning, where one or more trajectory primitives are used based on a primitive adjusting process 536 (whose details will be described below). When the teleoperator reviews relevant information, he may issue a teleoperation command. The teleoperation server may comprise a teleoperation command issuer 538 to communicate the command to the teleoperation command handling process of a teleoperation client. In some implementations, the teleoperation command issuer 538 may convert the teleoperation command into suitable machine instructions, e.g., alphanumeric strings or computer code.

Figure 6:
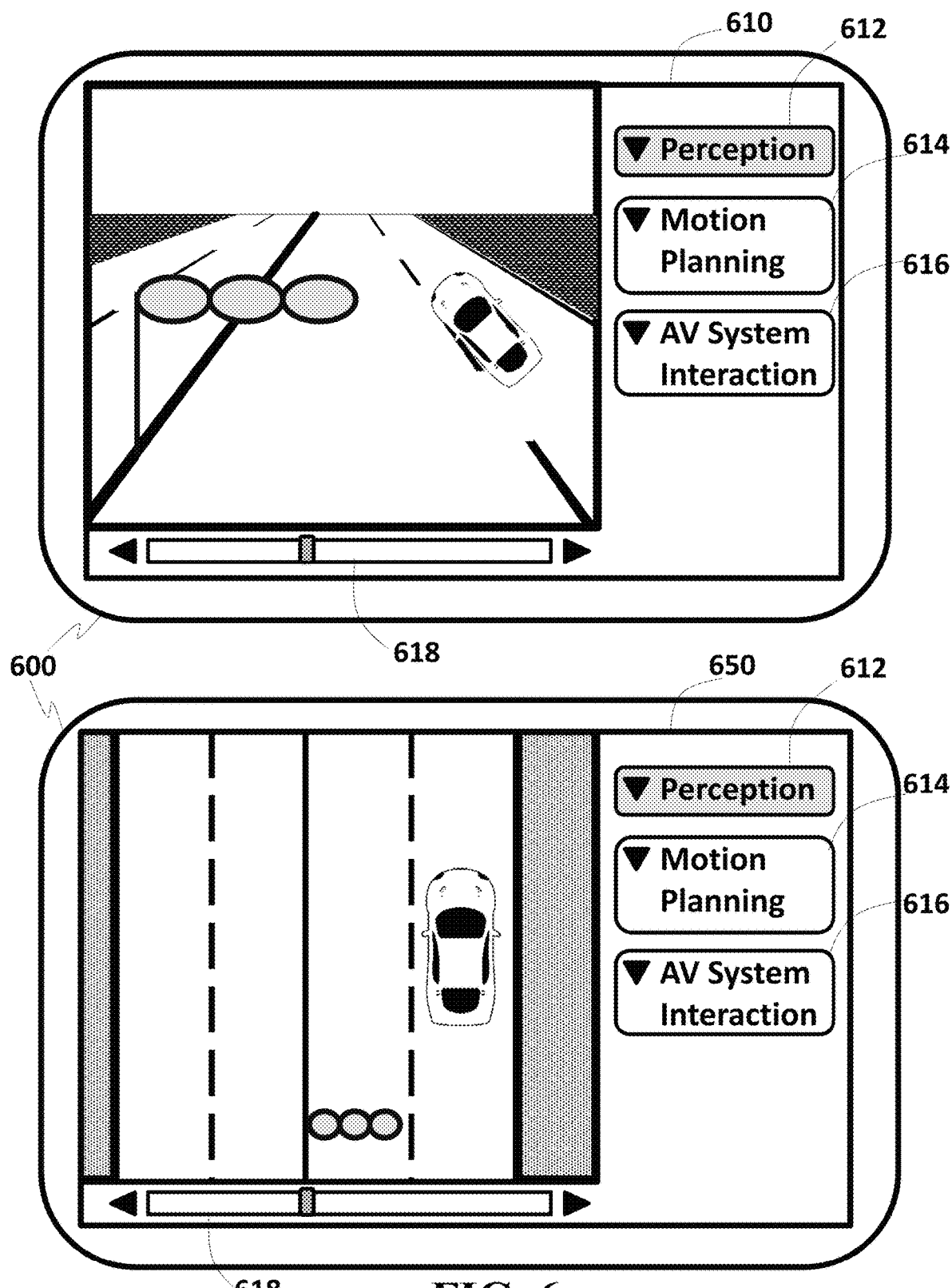
FIGS. 6-12 show examples of teleoperation interfaces.

A tele-interaction between a teleoperator and an AV system may rely on an interface apparatus. For example, FIG. 6 illustrates an apparatus 600 with which the teleoperator can choose what information (e.g., perception 612, motion planning 614, or AV system interaction 616 or combinations of them) to be displayed. In this example, the teleoperator may choose perception information 612, and the interface 610 may show a field of view of a vision sensor from the AV system. In some cases, the interface 650 may show a bird's-eye view of the vision sensor. Some implementations may comprise both a field of view and a bird's-eye view. The field of view or the bird's-eye view may be a view experienced by the AV system at the current moment, or a snap-shot at a past time or both. The perception information may comprise map information. The perception information may be an image or a video showing a 2D or a 3D view. When a video is presented, the interfaces 610 and 650 may comprise a navigation bar 618 to allow the teleoperator to control the video. In some implementations, the perception information may comprise processed data; for example, segmentation on images, perceived objects in vision data, detected but unrecognizable objects in vision data.

Figure 7:
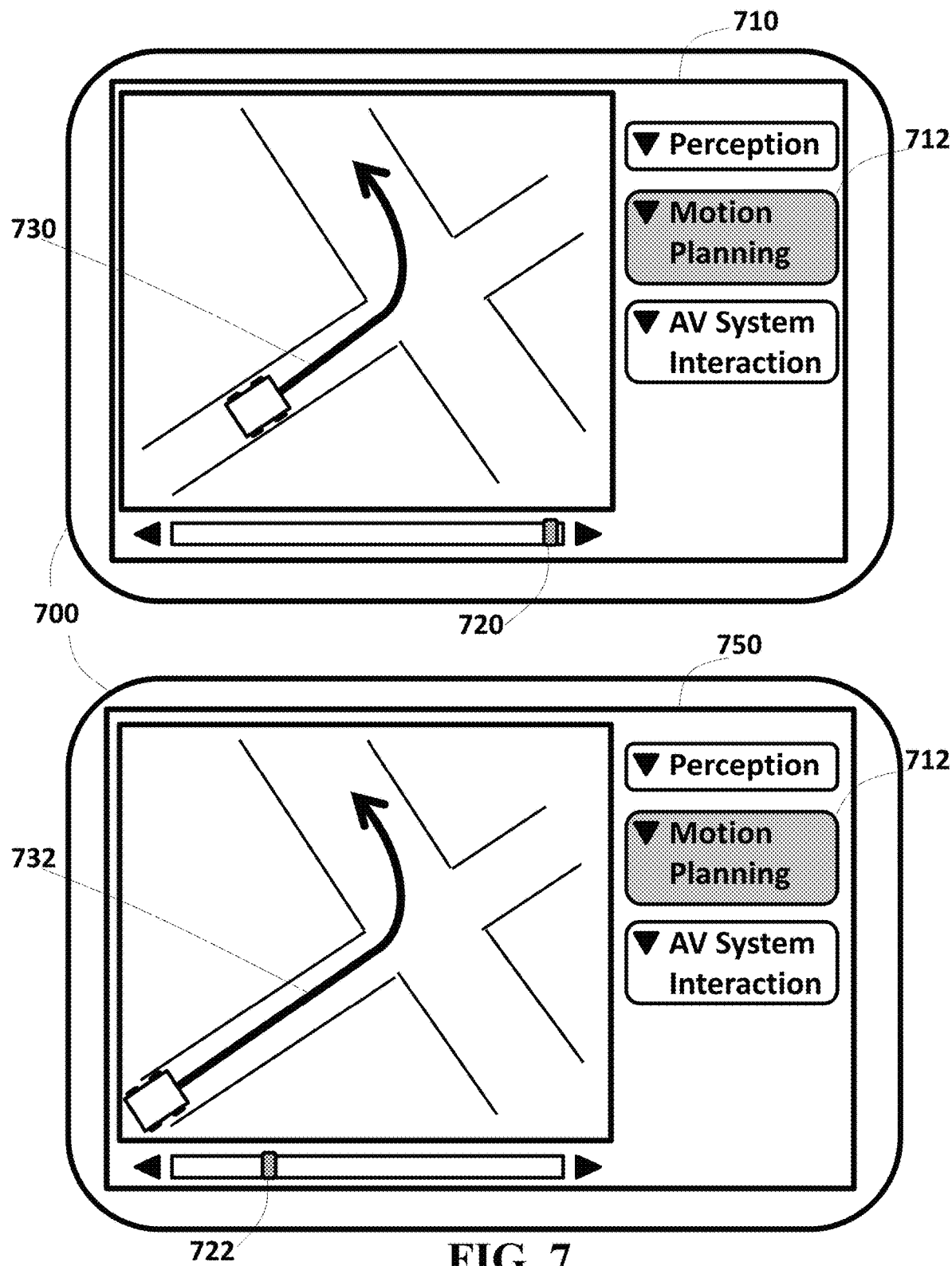

For example, FIG. 7 illustrates an apparatus 700 with which the teleoperator has chosen motion planning information 712 to be displayed on the interface 710. In some implementations, the interface 710 may show a map, a trajectory of the AV, a geolocation of the AV, or an orientation of the AV, or combinations of them. The trajectory may be a current trajectory 730 of the AV at the current moment, or a snap-shot at a past time, or a combination of them. The perception information may be shown as an image or a video showing a 2D or a 3D view. When a video is presented, the interfaces 710 and 750 may comprise a navigation bar 720 and 722, respectively. For instance, the interface 710 shows a current trajectory 730, but the teleoperator may rewind the display of the trajectory by moving the navigation bar 720 to a past time point 722 shown in the interface 750.

Referring to FIG. 2A, the teleoperation data associated with the teleoperation request may be stored in a remote database 226 by the AV system, and the teleoperation server 210 retrieves the teleoperation data from the database 226. In some implementations, the teleoperation data may be transmitted by the AV system to the teleoperation server along with the teleoperation request.

Tele-Interaction with the AV System.

The teleoperation server may enable the teleoperator to interact with a hardware component or a software process of the AV system, for example, one or more of the autonomous driving capabilities. Different types of tele-interactions are allowed. For example, a tele-interaction on localization helps the AV system to identify the AV system's location when an onboard localization process fails; a tele-interaction on trajectory helps the AV system to identify a new trajectory or update an existing trajectory; a tele-interaction on annotation helps the AV system to recognize a perceived object. Many other examples exist.

Tele-Interaction on Localization.

Figure 8:
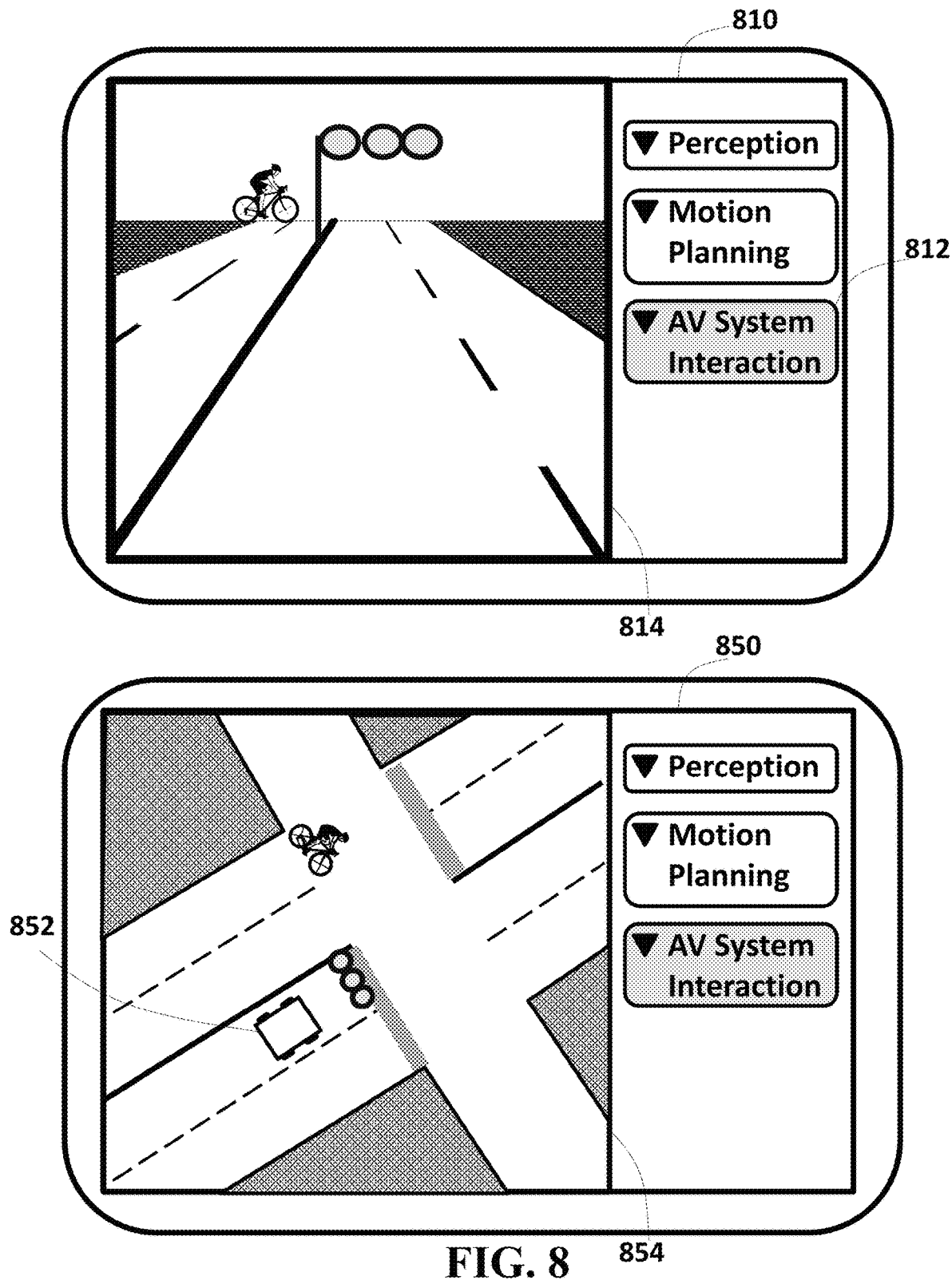

When a localization component (i.e., a process that determines the geolocation of the AV) on the AV system fails, a teleoperation event for the failed localization is generated. The teleoperator may invoke tele-interaction with respect to localization for the AV system, which guides the AV system to re-localize itself. For example, FIG. 8 illustrates a scenario in which the AV system is unable to localize itself, and a teleoperation request is sent to a teleoperator. The teleoperation server presents to the teleoperator an interface 810, and allows the teleoperator to activate an AV system tele-interaction 812. The teleoperation request may be transmitted along with perception data about the environment near the AV system, and the interface 810 displays a field of view 814. The teleoperator may review the environment and map data, and determine the location of the AV system on the map data. The interface 810 may change to the interface 850 during the tele-interaction and show a bird's-eye view 854 on the map data, and the teleoperator can place the location of the AV system at the spot 852.

The information identifying the position of the spot 852 is transmitted within a teleoperation command back to the AV system. In some implementations, the spot 852 identified by the teleoperator may be treated by the teleoperation command handling process as a deterministic command. Thus, a motion planning process may resume with the spot 852 considered as a starting position and search for an optimal trajectory toward the original goal.

In some implementations, the spot 852 may be treated as a non-deterministic location, and the teleoperation command handling process may use probabilistic reasoning to identify a true geolocation on the map data. For instance, the spot 852 may be considered as prior knowledge, and a conditional probability on the prior knowledge may be computed to infer a true geolocation of the AV system. In some cases, the conditional probability may consider other information comprising one or more of the following: past or current or both perception data, past or current or both trajectory data, map data, sensing data from an onboard sensor, sensing data from an off-board sensor, and data from an external data source.

Tele-Interaction on Motion Planning.

When a motion planning process on the AV system fails, a teleoperation event for the failed motion planning process may be generated. The teleoperator may invoke tele-interaction for motion planning for the AV system, which guides the AV system to identify a trajectory.

Figure 9:
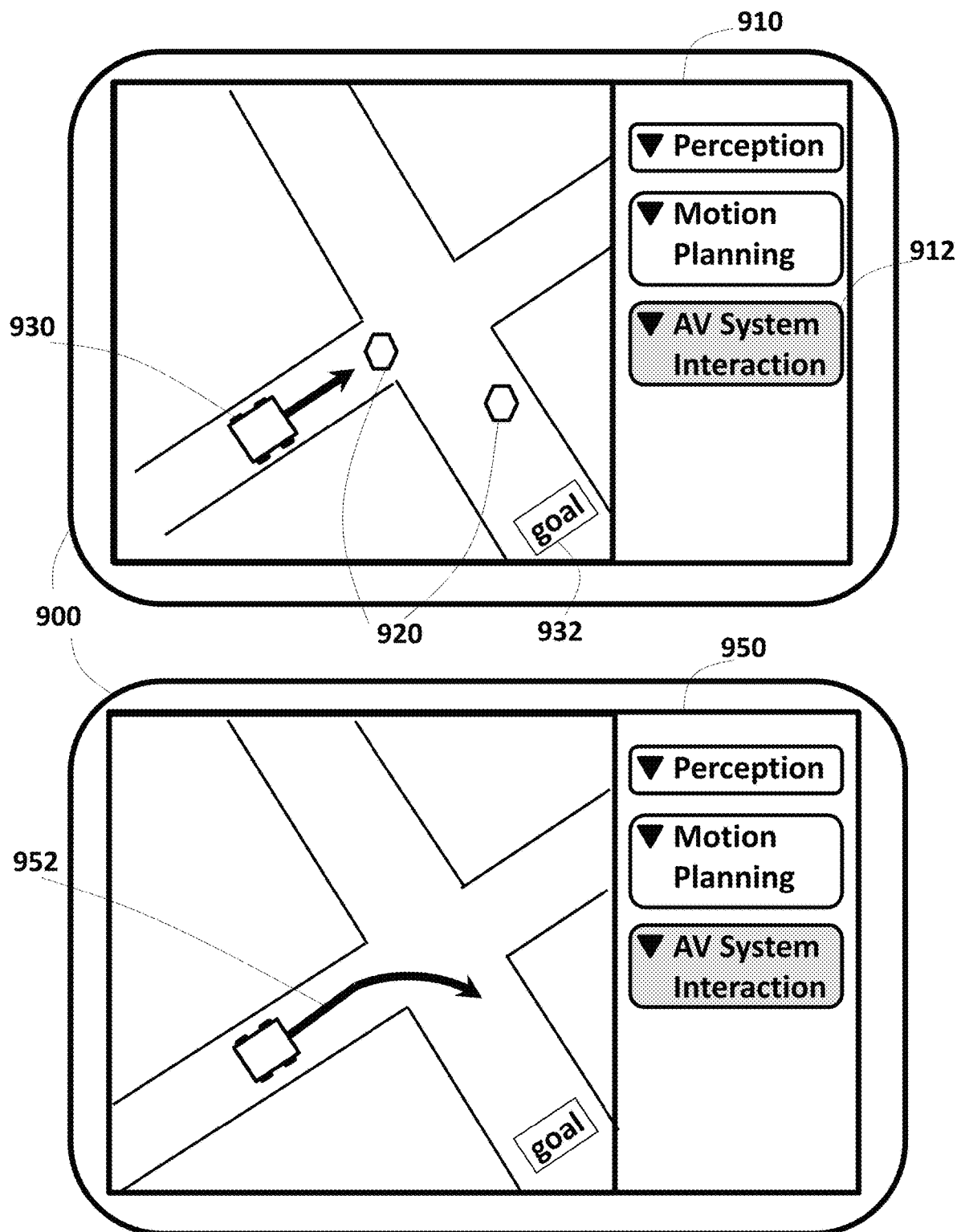

For example, FIG. 9 illustrates a scenario in which the AV system is unable to identify an adequate trajectory, and a teleoperation request is sent to a teleoperator. The teleoperation server presents to the teleoperator an interface 910, and allows the teleoperator to activate an AV system tele-interaction 912. The teleoperation request was transmitted along with, e.g., geolocation of the AV or map data or both. In some applications, data about the environment near the AV system may be transmitted with the teleoperation request.

The interface 910 may display a map around the AV 930 and a goal 932. The teleoperator may review the associated data and determine (e.g., draw) a new trajectory for the AV system 930 on the map. The interface 910 may switch to another interface 950 during the tele-interaction session and show a new trajectory 952 on the map data. A teleoperation command may comprise the new trajectory and may be sent to the teleoperation command handling process on the AV system.

In some implementations, the teleoperator provides one or more seeds 920 of a possible trajectory, and a new trajectory 952 is generated on the interface 950. A seed may be a point or a trajectory segment. A teleoperation command may comprise the one or more seeds, the new trajectory, or both, and be sent to the teleoperation command handling process on the AV system.

In a tele-interaction session, the teleoperator may interact with the motion planning process of the AV system. The teleoperator may perform one or more of the following:

Issue a new goal. The motion planning process then constructs a trajectory from the current location of the AV to the new goal through the road network using map data.

Figure 10:
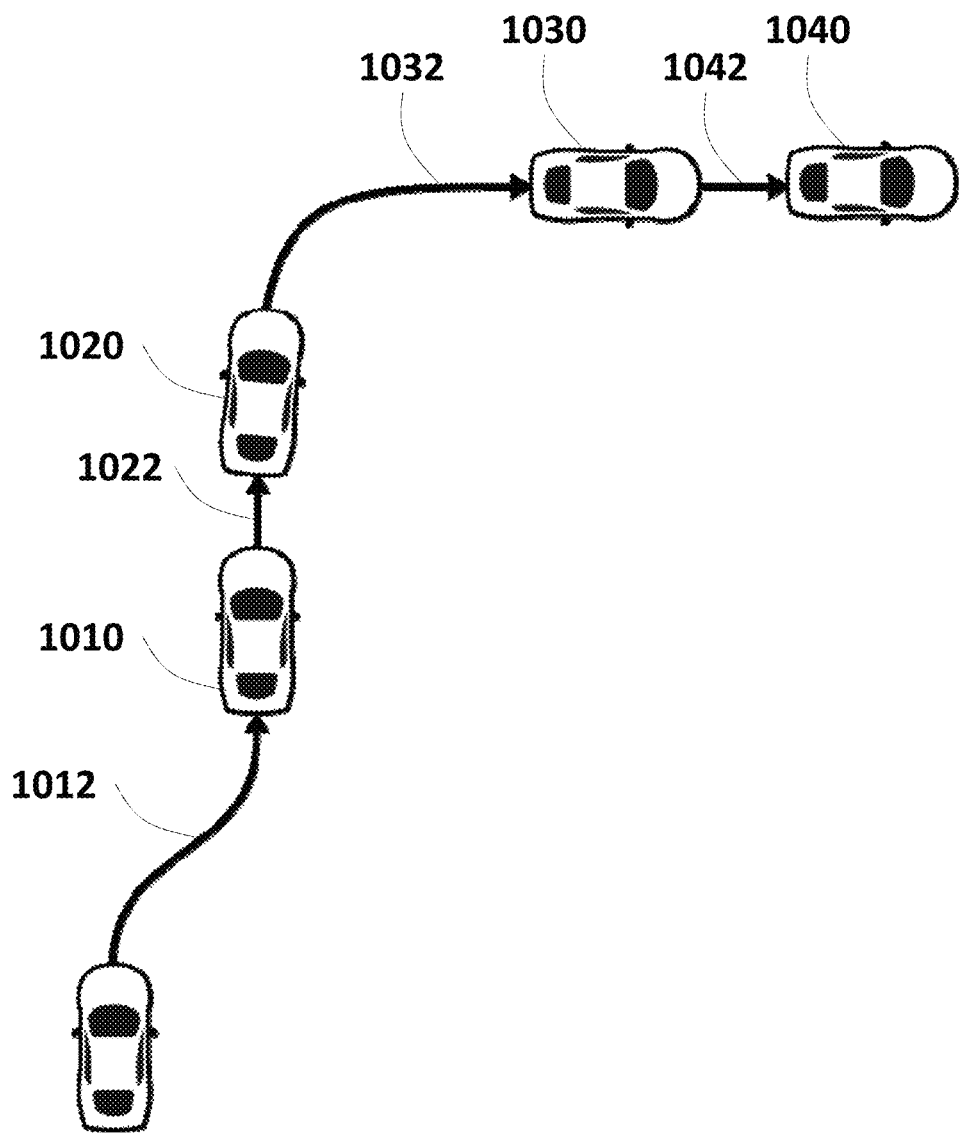

Issue a series of goals that are to be traversed sequentially. For example, FIG. 10 illustrates that a teleoperator designated goals 1010, 1020, 1030 and 1040 in a tele-interaction session. The motion planning process of the AV system then constructs a trajectory with segments 1012, 1022, 1032 and 1042 that starts from its current location and then sequentially passes through the series of goals.

Specify one or more segments of the road network to be un-traversable. For example, the motion planning process may then check a current trajectory and check if the current trajectory traverses any un-traversable segment of the road network. If so, the trajectory is re-planned to avoid the un-traversable segments. For instance, the specifying may be integrated into a map, e.g., by editing annotations on the map or drawing a new road segment or both.

Overwrite a travel preference or a travel rule. In some implementations, some events may cause the AV system to get stuck if the AV system remains executing its travel preferences or travel rules, and the teleoperator may issue a teleoperation command to overwrite the travel preference or the travel rules. For example, there may be an unusual event (e.g., a fire, a protest, an ambulance, a construction, a detour, or a marathon) taking place on the road where the AV system is driving, and a teleoperator may command the AV system to pass the unusual event by executing a lane shift to drive on an opposing lane. For instance, there may be an object (e.g., a beach ball) blocking the road, but the AV system cannot recognize what the object is and may decide to stay in put without hitting the object; a teleoperation system may be invoked, and after seeing the object via the teleoperation system, a teleoperator may issue a command to hit the object in order to let the AV system continue driving.

In some implementations, a tele-interaction may specify one or more of the following elements. The specification may be determined by the teleoperator or computationally derived or both.

A position (including an orientation) of the AV system. In some cases, a sequence of positions is described, and a transition between two consecutive positions may be added.

A speed profile describing a preferred velocity of the AV system on a trajectory segment or on the whole trajectory. The preferred velocity may be specified as a single value, an upper bound, a lower bound, or a range or combinations of them.

Properties of a trajectory segment or the whole trajectory. Examples of the properties include one or more of the following: a tracking error, a confidence interval, allowance or disallowance on being modified by the AV system's motion planning process, and additional data (e.g., an updated software process, a software patch, a remote database, an area on a map, an updated map, a sensor in infrastructure, detour information, fire report, events on road networks, and a government agency's data source) to be considered by the AV system.

Figure 11:
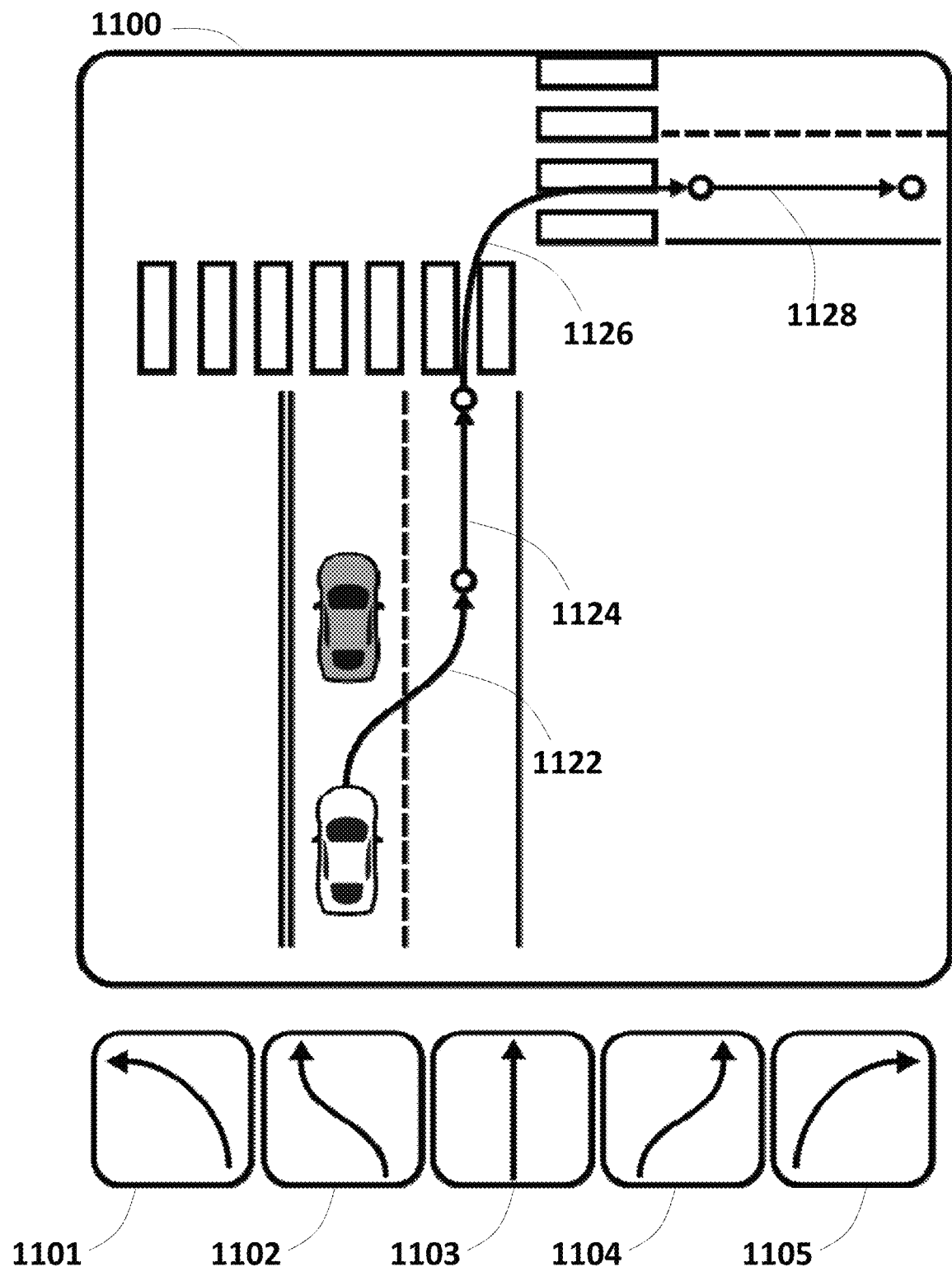

An interface for a tele-interaction on trajectory may rely on trajectory primitives for a teleoperator to generate or manipulate a trajectory. Referring to FIG. 11, an interface may show one or more trajectory primitives: a left turn 1101, a lane change to left 1102, a straight forward 1103, a straight backward, a lane change to right 1104, a right turn 1105, a U-turn left, a U-turn right, parallel parking or unparking, and perpendicular parking or unparking, or combinations of them, to name a few. A teleoperator may pick one or more trajectory primitives to generate or manipulate a trajectory. For instance, through the interface 1100, a trajectory can be assembled from the following primitives: a lane change to right 1122, a straight forward 1124, a right turn 1126, and a straight forward 1128.

A primitive may have a set of parameters that can be adjusted by the teleoperator. Examples of parameters may include one or more of the following: a segment length, a velocity of the AV system when entering the primitive, a velocity of the AV system driving along the primitive, a velocity of the AV when reaching the end of the primitive, allowance or prohibition of a lane change, a radius of a turn (e.g., left turn, right turn, and U-turn), a difference between a position (including orientation) at the beginning and the end of a turn, a maximum allowable yaw rotation rate of the AV during the traversal of the primitive, and an ending position of the primitive.

Referring FIG. 5, a teleoperation server 501 may comprise a primitive adjusting process 536 to handle the parameters across primitives. When a specific parameter is set by the teleoperator, the primitive adjusting process 536 may ensure that other parameters are automatically modified to be compatible with the current adjustment. For example, when a maximum allowable yaw rotation rate is being configured by the teleoperator, the primitive adjusting process may automatically modify the entry and exit speed of the primitive to ensure the maximum allowable yaw rotation rate is not exceeded. In some cases, the velocities of two connected primitives may be different, e.g., a first primitive may be set to 60 mph and the second may be set to 35 mph; since an immediate velocity reduction from 60 mph to 35 mph is impossible for the AV, the primitive adjusting process may computationally smooth the velocities across the two primitives.

In some implementations, after a first primitive is selected and set by a teleoperator, the primitive adjusting process 536 may recommend options of feasible primitives that may be connected with the first primitive. When a second primitive is determined to be connected with the first primitive, the default parameter values of the second primitive may be automatically inferred by the primitive adjusting process 536 to ensure the compatibility (e.g., velocity, position and turn) across the connected primitives.

The primitive adjusting process 536 may utilize other data sources, such as map data, to appropriately set default values of the parameters. For example, an entry or exit velocity of a primitive may be set according to a speed limit of the road on which the AV system is; a default lateral offset of a lane-change maneuver may be set automatically according to the width of a lane where the AV is currently driving.

Referring FIG. 5, a teleoperation server 501 may comprise a teleoperation command issuer 538 to handle teleoperation commands generated by a tele-interaction session. The teleoperation command issuer 538 may convert the teleoperation command into suitable machine instructions, e.g., alphanumeric strings or computer code. A teleoperation command generated by a tele-interaction session may comprise any tele-interaction activities taking place during the session. Referring FIG. 4A, when a teleoperation command handling process 440 in the AV system 410 receives a teleoperation command 452, the teleoperation command handling process 440 may generate, edit, and act on the teleoperation command. In some cases, a teleoperation command 452 may comprise a trajectory, and the teleoperation command handling process may treat the trajectory as deterministic or non-deterministic or both, and then execute the trajectory. When the teleoperation command handling process 440 treats the trajectory (or a portion of the trajectory) as non-deterministic, editing the trajectory (or the portion of the trajectory) may base on probabilistic reasoning taking into account other information comprising one or more of the following: past or current or both perception data, past or current or both trajectory data, map data, sensing data from an onboard sensor, sensing data from an off board sensor, and data from an external data source.

In some implementations, the teleoperation command handling process 440 may infer missing information. For example, a pair of positions (including orientations) at two locations may have been designated by the teleoperation command 452, but the connecting trajectory from one position to the other may be missing in the teleoperation command. The teleoperation command handling process 440 may, by itself or by invoking the motion planning process, generate a feasible connecting trajectory from one position to the other. Inferring the missing trajectory may be performed using a rule-based system that, for example, transforms a positional difference between the two positions into a smooth trajectory. Inferring the missing trajectory may be cast as an optimization problem in which variables are intermediate positions between the given pair of positions, and a cost function can be defined as positional differences between the intermediate positions; e.g., the cost function may be a sum of squares of positional differences. Minimizing the cost function will result in an optimal trajectory, which will ensure the resulting transition exhibits smooth and gradual changes in driving orientations.

In some implementations, a teleoperation command 452 may comprise a trajectory without a speed profile, the teleoperation command handling process 440 may, by itself or by invoking the motion planning process, generate a speed profile that leads to safe traversal of the trajectory by considering data from other data sources, such as positions and velocities of other objects (e.g., vehicles and pedestrians) from the perception processes and road information from the map. A speed profile may be derived by dynamic programming where velocity constraints are propagated backward from the end to the beginning of the trajectory according to safety and comfort constraints.

Tele-Interaction on Hardware Components or Software Processes.

Figure 12:
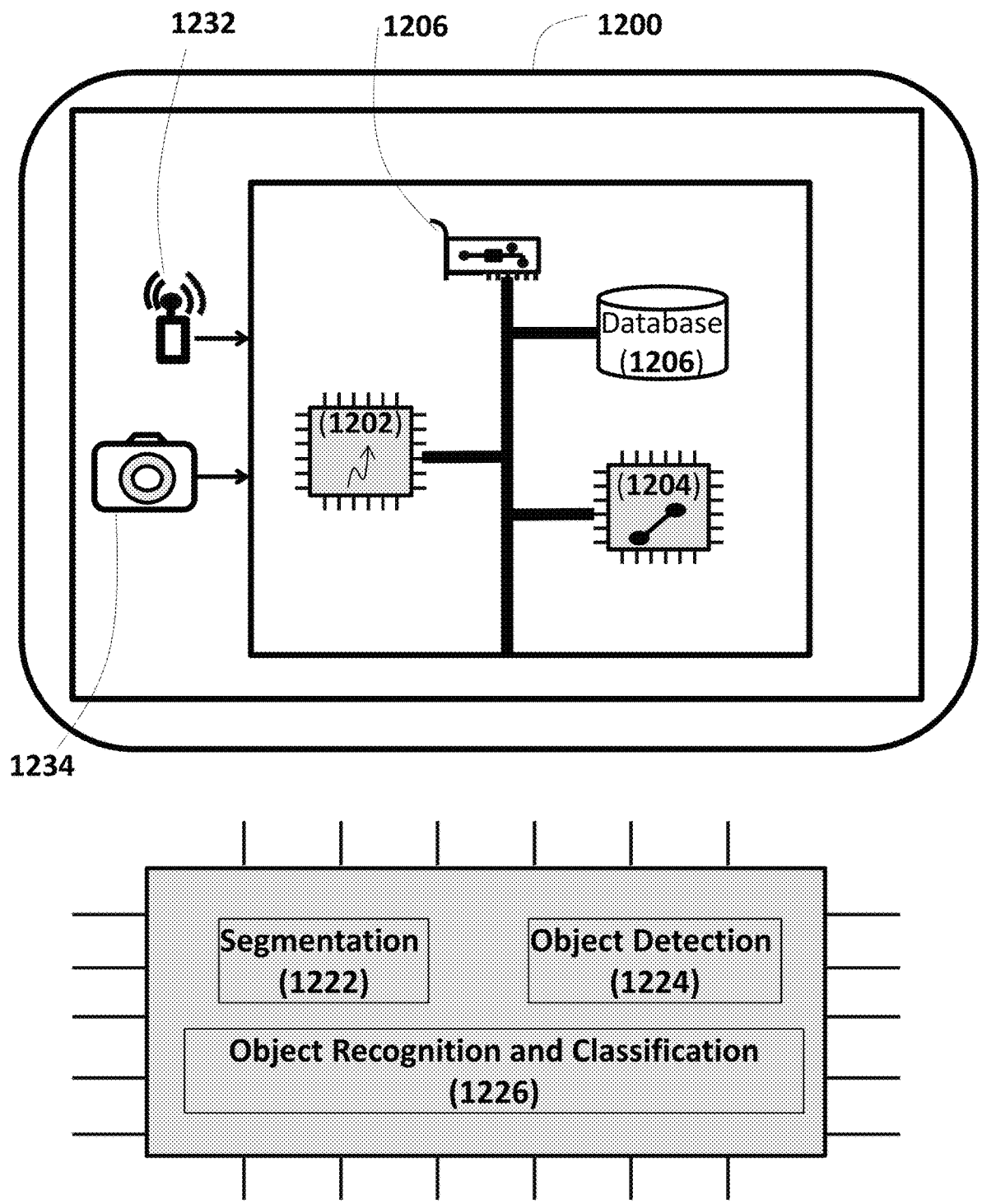

When a teleoperation request arrives at a teleoperation server, the teleoperator may invoke tele-interaction on hardware components or software processes (e.g., autonomous driving capabilities) of the AV system. For example, FIG. 12 illustrates a scenario in which the teleoperation server presents to the teleoperator an interface 1200, and allows the teleoperator to activate an AV system tele-interaction to remotely handle hardware components or software processes (e.g., autonomous driving capabilities) of the AV system. The teleoperator may select a process (e.g., a motion planning process 1202, or a perception process 1204) and then disable or enable the process. In some cases, the interface 1200 may allow the teleoperator to edit functionalities of the process. In some cases, the interface 1200 may allow the teleoperator to view, create, change, edit, delete, import or export data entries in an onboard database 1206.

In some implementations, the interface 1200 may allow the teleoperator to zoom into a software process for editing one or more internal steps, or zoom into a hardware component for editing one or more subcomponents. For instance, the teleoperator may select the perception process 1204, and internal steps (e.g., segmentation 1222, object detection 1224, and object recognition and classification 1226) may be displayed. The teleoperator may select a step to view, create, change, edit, delete, enable, disable, invoke, or neglect a parameter or an algorithm of the step.

In some implementations, the interface 1200 may display sensors (e.g., LIDAR 1232 or vision sensor 1234) of the AV system. In some cases, the interface 1200 may allow the teleoperator to view, edit, enable or disable functionalities and parameters of the sensors. In some cases, the interface 1200 may allow the teleoperator to view, create, change, edit, delete, enable, disable, invoke, or neglect data acquired from the sensors.

Although the descriptions in this document have described implementations in which the teleoperator is a person, teleoperator functions can be performed partially or fully automatically.

Other implementations are also within the scope of the claims.

The invention claimed is:

1. A method of intervening in an operation of at least one autonomous driving capability of a vehicle, the method comprising:
   determining, by one or more processors, that a request for an intervention in the operation of the at least one autonomous driving capability of the vehicle is appropriate;
   treating, by the one or more processors, a current location of the vehicle as a non-deterministic location having a conditional probability;
   identifying, by the one or more processors, a geolocation of the vehicle based on probabilistic reasoning using the conditional probability;
   prioritizing the request for the intervention based on the geolocation; and
   intervening in the operation of the at least one autonomous driving capability of the vehicle.

2. The method of claim 1, in which the determining that the request for the intervention is appropriate comprises receiving the request for the intervention.

3. The method of claim 1, in which the determining that the request for the intervention is appropriate comprises receiving information about a status or environment of the vehicle or a related AV system.

4. The method of claim 3, in which the status or the environment of the vehicle comprises a functionality of a hardware component or software of the vehicle or the AV system.

5. The method of claim 3, in which the information about the status or the environment of the vehicle or the AV system comprises a signal from a hardware component or software of the vehicle or the AV system.

6. The method of claim 5, in which the determining that the request for the intervention is appropriate comprises analyzing the signal to detect presence of unexpected data or absence of expected data.

7. The method of claim 6, in which analyzing the signal comprises evaluating a mismatch between a measured quantity and a model-estimated quantity for the hardware component or software.

8. The method of claim 6, in which analyzing the signal comprises using pattern recognition to evaluate an abnormal pattern in the signal.

9. The method of claim 8, in which the abnormal pattern is learned by a machine learning algorithm.

10. The method of claim 6, in which analyzing the signal comprises inferring a malfunction in the hardware component or the software.

11. The method of claim 6, in which analyzing the signal comprises detecting an unknown object present in the environment of the vehicle or a related AV system.

12. The method of claim 6, in which analyzing the signal comprises inferring an event that is or will be happening in the environment of the vehicle or a related AV system.

13. The method of claim 2, in which the request comprises a request initiated over a wireless communication channel by a remote operator.

14. The method of claim 2, in which the request comprises data associated with a status or environment of the vehicle or a related AV system.

15. The method of claim 2, in which the request comprises one or more signals from one or more hardware components or one or more software processes of the vehicle or a related AV system.

16. The method of claim 1, further comprising, based on the determination, causing a fallback intervention in the operation of the at least one autonomous driving capability of the vehicle.

17. The method of claim 16, in which the fallback intervention comprises causing the vehicle or a related AV system to enter a fully autonomous driving mode, a semi-autonomous driving mode, or a fully manual driving mode.

18. The method of claim 16, in which the fallback intervention comprises causing the vehicle to operate at a reduced velocity.

19. The method of claim 16, in which the fallback intervention comprises identifying a safe-to-stop location.

20. The method of claim 19, in which the fallback intervention comprises generating a new trajectory to the safe-to-stop location.

21. The method of claim 16, in which the fallback intervention comprises invoking a backup hardware component or a backup software process.

22. The method of claim 16, in which the fallback intervention comprises evaluating a functional hardware component or a functional software processes required to operate the vehicle.

23. The method of claim 1, in which the determining that the request for the intervention is appropriate comprises evaluating one or more active events associated with the vehicle or a related AV system, or associated with the environment of the vehicle or a related AV system.

24. The method of claim 23, in which evaluating one or more events comprises merging two or more active events.

25. The method of claim 1, further comprising presenting an interactive interface.

26. The method of claim 25, in which presenting an interactive interface comprises presenting a field of view or a bird's-eye of a vision sensor of the vehicle.

27. The method of claim 25, in which presenting an interactive interface comprises presenting current or past or both perception information.

28. The method of claim 25, in which presenting an interactive interface comprises presenting current or past or both trajectories.

29. The method of claim 25, in which presenting an interactive interface comprises presenting current or past or both motion planning information.

30. The method of claim 25, in which presenting an interactive interface comprises presenting a system diagram of the vehicle, the system diagram comprising one or more hardware components, or one or more software processes, or both.

31. The method of claim 1, in which the intervention comprises treating the current location as prior knowledge and using an inference algorithm to update the current location.

32. The method of claim 1, in which the intervention is based on a person identifying a goal location of the vehicle, and the intervening comprises treating the goal location as prior knowledge and using an inference algorithm to update the goal location.

33. The method of claim 1, in which the intervention comprises one or more trajectory sampling points identified by a person, and the intervening comprises inferring a trajectory or a trajectory segment based on the one or more trajectory sampling points.

34. The method of claim 33, in which inferring a trajectory or a trajectory segment is based on one or more trajectory primitives.

35. The method of claim 33, in which the intervening comprises concatenating two trajectory segments.

36. The method of claim 35, in which concatenating two trajectory segments comprises smoothing the trajectory segments and smoothing speed profiles across the trajectory segments.

37. The method of claim 1, in which the intervening comprises specifying one or more un-traversable road segments.

38. The method of claim 1, in which the intervention comprises setting a speed profile by a person, and the intervening comprises treating the speed profile as prior knowledge and using an inference algorithm to update the speed profile.

39. The method of claim 1, in which the intervening is based on inferring a speed profile by a learning algorithm.

40. The method of claim 1, in which the intervening is based on inferring a steering angle by a learning algorithm.

41. The method of claim 1, in which the intervening comprises enabling, editing or disabling a hardware component or a software process.

42. The method of claim 41, in which the intervening comprises enabling, editing or disabling a subcomponent of a hardware component or a processing step of a software process.

43. The method of claim 1, in which the intervening comprises overwriting a travel preference or a travel rule.

44. The method of claim 1, in which the intervening comprises editing data, the data comprising one or more of the following: a map, sensor data in the vehicle or a related AV system, trajectory data in the vehicle or a related AV system, vision data in the vehicle or a related AV system, or any past data in the vehicle or a related AV system.

45. The method of claim 1, further comprising configuring the vehicle or a related AV system based on a command, the configuration comprising treating the command as prior knowledge and using an inference algorithm to update the command.

* * * * *